US011143792B2

(12) United States Patent
Reichmuth et al.

(10) Patent No.: US 11,143,792 B2
(45) Date of Patent: Oct. 12, 2021

(54) NETWORKED PERSONAL WEATHER DEVICES AND RELATED METHODS FOR PROVIDING WEATHER INFORMATION

(71) Applicant: Weatherman, Inc, Brooklyn, NY (US)

(72) Inventors: Richard Reichmuth, Brooklyn, NY (US); Jonathan Edward McCottry, II, Alexandria, VA (US); Ivan Alejandro Herrera Agassini, Zapopan (MX)

(73) Assignee: Weatherman, Inc., Brooklyn, NY (US)

( * ) Notice: Subject to any disclaimer, the term of this patent is extended or adjusted under 35 U.S.C. 154(b) by 368 days.

(21) Appl. No.: 16/041,718

(22) Filed: Jul. 20, 2018

(65) Prior Publication Data

US 2019/0025462 A1      Jan. 24, 2019

Related U.S. Application Data

(60) Provisional application No. 62/535,203, filed on Jul. 20, 2017.

(51) Int. Cl.
| | |
|---|---|
| *G01N 1/10* | (2006.01) |
| *G01N 1/02* | (2006.01) |
| *G01N 1/00* | (2006.01) |
| *H04W 4/08* | (2009.01) |
| *H04W 4/021* | (2018.01) |
| *H04W 4/38* | (2018.01) |
| *H04L 29/08* | (2006.01) |
| *A45B 25/22* | (2006.01) |
| *A45B 25/14* | (2006.01) |
| *A45B 23/00* | (2006.01) |
| *G01W 1/10* | (2006.01) |

(Continued)

(52) U.S. Cl.
CPC .............. *G01W 1/10* (2013.01); *A45B 23/00* (2013.01); *A45B 25/143* (2013.01); *A45B 25/22* (2013.01); *G01W 1/02* (2013.01); *H04W 4/021* (2013.01); *H04W 4/08* (2013.01); *A45B 2200/1009* (2013.01); *G01W 2001/006* (2013.01); *G01W 2203/00* (2013.01); *H04L 67/12* (2013.01); *H04W 4/38* (2018.02)

(58) Field of Classification Search
CPC .............. G01W 1/02; G01W 2203/00; G01W 2001/006; H04W 4/08; H04W 4/021; H04W 4/38; A45B 2200/1009; Y02A 90/10
See application file for complete search history.

(56) References Cited

U.S. PATENT DOCUMENTS

| | | |
|---|---|---|
| 5,848,378 A | 12/1998 | Shelton et al. |
| 7,271,715 B2 | 9/2007 | Aupperle et al. |
| | (Continued) | |

FOREIGN PATENT DOCUMENTS

| | | | |
|---|---|---|---|
| CN | 203424417 | | 2/2014 |
| CN | 203424417 U | * | 2/2014 |
| | (Continued) | | |

*Primary Examiner* — Manuel L Barbee
(74) *Attorney, Agent, or Firm* — Capitol Patent & Trademark Law

(57) ABSTRACT

The formation of dynamic, micro-climate groups consisting of passive and active weather collecting devices is provided. Such devices may collect weather information in real-time. The collected information may be distributed weather information and or forecasts to individuals in a particular geographical area or to other subscribers.

15 Claims, 19 Drawing Sheets

(51) Int. Cl.
  *G01W 1/02* (2006.01)
  *G01W 1/00* (2006.01)

(56) References Cited

U.S. PATENT DOCUMENTS

| | | |
|---|---|---|
| 8,866,607 B2 | 10/2014 | Velusamy |
| 9,978,080 B2 | 5/2018 | Nanus |
| 2001/0049584 A1 | 12/2001 | Jones et al. |
| 2008/0109153 A1 | 5/2008 | Gueziec |
| 2013/0059607 A1 | 3/2013 | Herz et al. |
| 2014/0145845 A1 | 5/2014 | Sattari |
| 2014/0372360 A1* | 12/2014 | Asrani .................... G01W 1/10 706/47 |
| 2015/0084745 A1 | 3/2015 | Hertz et al. |
| 2015/0156567 A1 | 6/2015 | Oliver et al. |
| 2015/0248275 A1* | 9/2015 | Gallo ....................... G01T 7/00 702/189 |
| 2016/0116640 A1* | 4/2016 | Phillips .................. G01W 1/10 702/3 |
| 2017/0092139 A1* | 3/2017 | Wang ..................... G01S 13/87 |
| 2018/0244386 A1* | 8/2018 | Phan ...................... B64C 27/12 |

FOREIGN PATENT DOCUMENTS

| | | |
|---|---|---|
| CN | 204519617 | 8/2015 |
| CN | 205197213 | 5/2016 |

\* cited by examiner

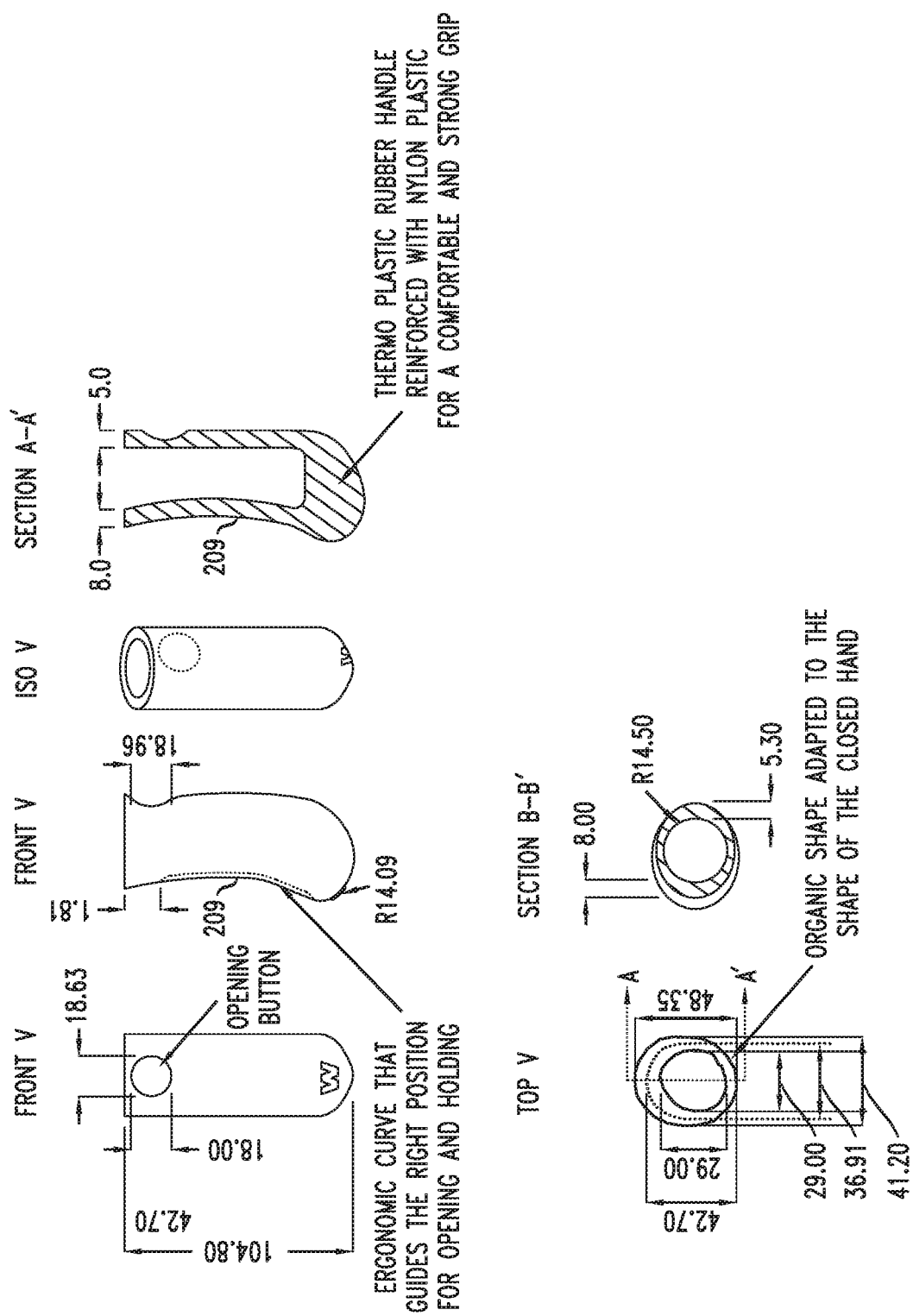

NETWORKED PERSONAL WEATHER DEVICES AND RELATED METHODS FOR PROVIDING WEATHER INFORMATION

RELATED APPLICATION

This application claims priority to U.S. Provisional Application No. 62/535,203 filed Jul. 20, 2017 (the "'203 application"). This application incorporates by reference the entirety of the '203 application as if set forth in full herein.

INTRODUCTION

While umbrellas have been around for centuries, little work has been done to collect the data they are capable of collecting to compute real-time, local weather conditions and distribute this information in a timely manner. Even the best technology that exists today, such as National Oceanic & Atmospheric Administration (NOAA) weather radar installations, do not provide accurate information about the weather that is occurring at a particular geographical location. For example, these installations are fixed installations. Further, the radars that these installation use to determine weather conditions may be able to accurately determine the weather conditions in areas that are located close to a given installation, but are typically unable to accurately determine the weather conditions in an area that may be remote from the installation (e.g., in an area that is between two installations, and remote from each). In addition, these installations may not be able to accurately determine the weather conditions for an area that may not be remote, but, due to its topography does not allow signals from a radar to penetrate. Thus, whatever signals are returned to the radar may be highly inaccurate. Still further, it is known that radar images of weather conditions sometimes indicate that there is precipitation (e.g., rain) falling on a specific location but, in reality, the precipitation never reaches the ground having been evaporated before it has a chance to do so. Further, radar technology has a difficult time reliably detecting some types of precipitation, such as mist or a misty rain. Still further, even when radar does accurately detect precipitation (or the lack thereof), there is an inherent lag in the time between the detection of the precipitation and other weather conditions (collectively, precipitation and other weather conditions will be referred to hereafter as "weather conditions") and the time that the information is presented in an understandable form to those who most need to know about such conditions. Said another way, by the time such information is provided to people in the area of the weather condition (e.g., those who may be inside a house, building or other shelter, but are planning on going outside) or those planning on entering such an area, the information may already be too old to be useful (e.g., the weather conditions may have changed).

Accordingly, it is desirable to provide improvements in the devices and related methods that provide weather information.

SUMMARY

The present invention provides for systems and related methods for forming dynamic, micro-climate groups. One such system may comprise a network server operable to form one or more groups comprising passive and active weather collecting devices capable of collecting weather information in real-time. The server may be further operable to distribute collected weather information or forecasts to individuals in a particular geographical area or to subscribers. Further, the exemplary server yet be further operable to complete weather-related computations based on the passively and actively collected weather information, in conjunction with stored historical information.

DETAILED DESCRIPTION OF INVENTIVE EMBODIMENTS

Figure 1:
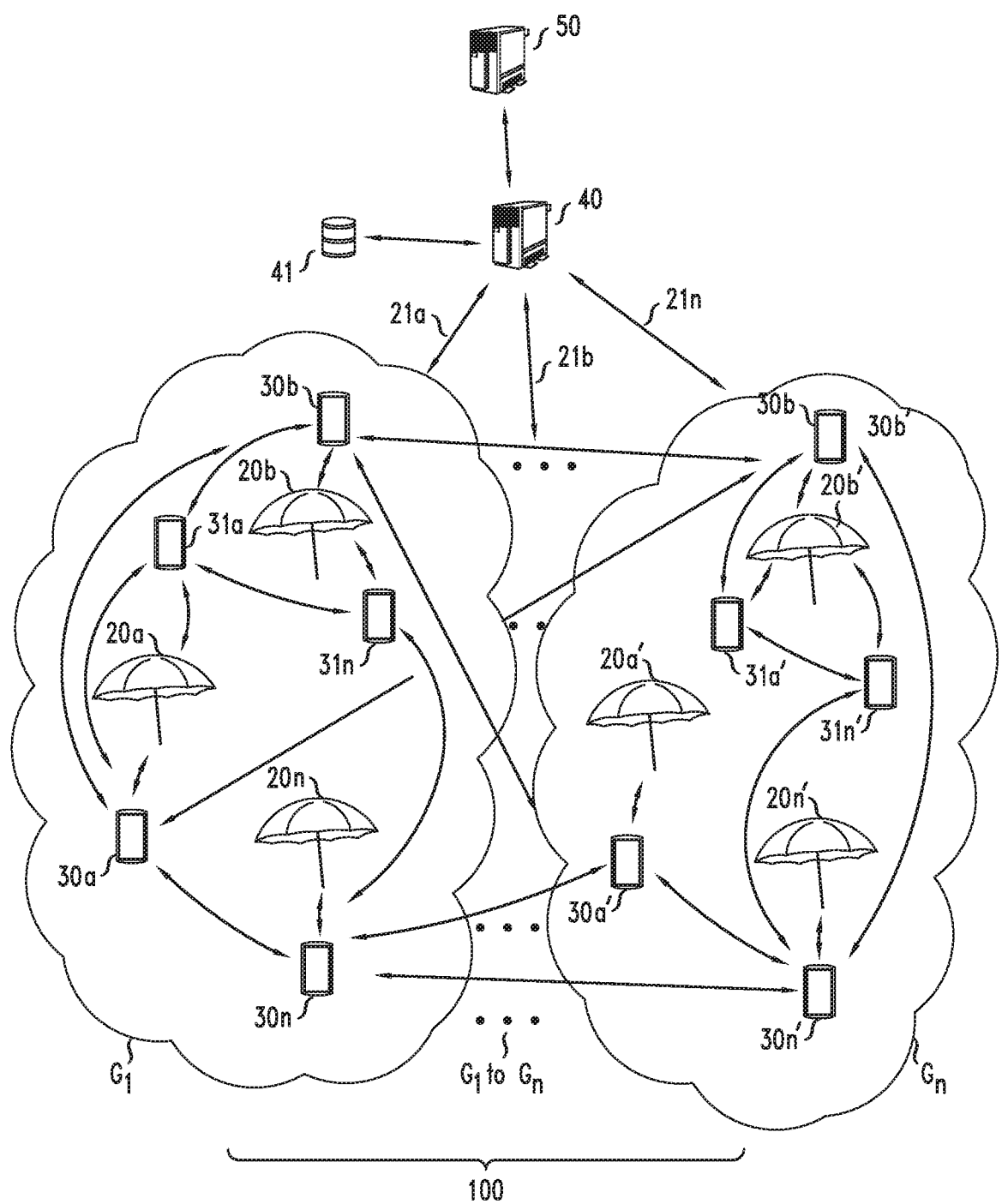
FIG. 1 depicts an exemplary inventive network according to an embodiment of the invention.

Exemplary embodiments of methods and devices for providing weather information, among other things, are described herein. Although specific exemplary embodiments are discussed herein, there is no intent to limit the scope of the present invention to such embodiments. To the contrary, the exemplary embodiments discussed herein are for illustrative purposes. Modified and alternative embodiments may be implemented without departing from the scope of the present invention. Said another way, the exemplary embodiments presented herein are only some of the many that fall within the scope of the present invention, it being practically impossible for the inventor to describe all the many possible exemplary embodiments and variations that fall within the scope of the present invention.

As used herein the phrase "passive" collection device or system means a device or system that detects, measures and at least temporarily stores (collectively referred to as "collecting" or "collection") weather-related information without the involvement of an individual. In contrast, the phrase "active" collection device means a device or user device whose primary function is to receive (and store at least temporarily) weather-related information, that has already been measured, from an individual. Thus, an active device is mainly a means to temporarily store and then share weather-related information input into it by a user. It should be understood that a single specific device may sometimes have the ability to function as part of a passive collection system and other times function as an active collection device. One example of a passive collection device is an inventive umbrella further described herein. One example of an active collection device is a wireless smartphone. Yet further, on example of a device that may function as a part of a passive collection system and as an active collection device is a smartphone that is communicatively paired with (i.e., connected to) an umbrella, as described in more detail herein.

It should be understood that while an umbrella is discussed herein as being an example of a passive collection device and a wireless device (e.g., smartphone) is discussed herein as being an example of an active collection device or as being a part of a passive collection system when communicatively paired with an umbrella, these are just two examples of devices that may be used as a passive and/or active collection devices for collecting weather-related information.

It should be understood that when the description herein describes the use of a microcontroller such a device may include one or more elements. For example, the microcontroller may comprise one or more electronic processors and memories. The processors may be operable to execute stored, specialized instructions for completing features and functions described herein. Such instructions may be stored in an onboard memory, in separate memory, or in a specialized database for example. Such instructions represent processes, functions and features that have been integrated into memory as stored electronic signals.

It should also be understood that one or more exemplary embodiments may be described as a process or method. Although a process/method may be described as sequential, such a process/method may be performed in parallel, concurrently or simultaneously. In addition, the order of each step within a process/method may be re-arranged. A process/method may be terminated when completed, and may also include additional steps not included in a description of the process/method.

As used herein the word "user' is an individual that is operating, or may operate, a passive or active device or system. Similarly, the phrase "user device" means a passive or active device being capable of being used by a user. One example of a user device is a wireless smartphone. The phrases "user" and "user device" as used herein may be used synonymously unless the context of the usage, or common sense, dictates otherwise.

As used herein, the term "and/or" includes all combinations of one or more of the associated listed items. As used herein, the singular forms "a," "an" and "the" are intended to include the plural form, unless the context and/or common sense indicates otherwise. It should be further understood that the terms "comprises", "comprising,", "includes" and/or "including", when used herein, specify the presence of stated features, systems, subsystems, steps, operations, elements, and/or components, but do not preclude the presence or addition of one or more other features, systems, subsystems, steps, operations, elements, components, and/or combinations thereof.

As used herein the phrase "operable to" means "functions to".

As used herein, the designations "first", and "second", etc., are used to distinguish one component (e.g., element type, element, application (APP), device, subsystem, section, etc.) or part of a process from another and does not indicate an importance, priority or status. In fact, the component or parts of a process could be re-designated (i.e., re-numbered) and it would not affect the operation of systems or methods provided by the present invention.

As used herein the phrases "connection", "connected to", or similar phrases means an indirect or direct physical connection between at least two different parts of a system, device, subsystem or subassembly or means one part of a system, device, subsystem or subassembly is subsumed within (and thereby connected to) at least one other part of a system, device, subsystem or subassembly. When one component of a system, device, subsystem or subassembly is described or depicted as being connected to another component, other well-known elements used to facilitate such a connection may not be described or depicted because such elements are well known to those skilled in the art.

Yet further, when one component of a system, device, subsystem or subassembly is described or depicted as being connected to another component using "a connection" (or single line in a figure) it should be understood that practically speaking such a connection (line) may comprise (and many times will comprise) more than one physical connection or channel, may be omni-directional or bi-directional, may or may not include separate data, formatting and signaling and may be wireless or wired.

Still further, when one user device is described as communicating, or exchanging signals, with another user device or with a network-based device (e.g. server) such communications and exchanges may include a web browser that is a part of an interface, and/or one or more "applications" (referred to herein as an "APP" or "APPs") that have been installed into, or downloaded onto, the user device. An "APP" may include "content" (e.g., text, audio and video files), signaling and configuration files. For the sake of convenience and not limitation, the terms "APP" or "application" are used herein to refer to any application, but use of such a term also includes a reference to any file or data.

In one embodiment, an APP to be downloaded onto a user device may also reside or be stored on one or more hardware devices, such as a network or central or APP server in whole and/or in part, the later indicating that the APP may be distributed among, and by, several devices (servers). An APP may be downloaded to a user device from an APP server (or servers) or have been otherwise provided and installed on such a server. A given user device may have a need for one or more of the APPs installed on a server. Accordingly, each of the embodiments described herein includes protocols, necessary hardware, software and firmware resident on a user device for transmitting and receiving an APP, content and/or content identification information relating to the APP from/to a server and vice-versa. Depending on the content to be transmitted, an APP may be installed directly on a user device or may be downloaded from a server by initiating a request to a server to receive a local copy of the APP. When a discussion herein describes the sending and reception of data (i.e., transmissions and receptions) from/to a user device to/from another user or network device, a web browser and/or APP may be used to complete such transmissions and receptions.

It should further be understood that some of the systems and devices described herein (e.g., network server, weather computing system) may include the ability for a third party or a user to access all, or some, of the functionality of such a system and device described herein using, for example, an application programming interface (API). In general, an API is a set of subroutine definitions, protocols, and tools that some systems and devices described herein provide to enable users and third parties to build connections to the systems and devices described herein as well create their own software and applications. More particularly, some of the systems and devices described herein may provide APIs that are suitable for a web-based system, operating system, database system, computer hardware, or software library. The API may include a specification, including, but not limited to, routines, data structures, object classes, variables, or remote calls.

It should be noted that the systems, devices, subsystems and subassemblies (and their components) illustrated in the figures may not be drawn to scale, may not represent an actual shape or size and may not represent an actual system, device layout, subsystem, subassembly, manufacture's drawing or visual. Rather, the systems, devices, subsystems, subassemblies and components are drawn to simply help explain the features, functions and processes of exemplary embodiments of the present invention described herein and covered by the claims set forth at the end of this description.

It should be understood that each of the physical embodiments of the systems, devices, subsystems, subassemblies and related methods described herein, and their components/steps are configured with, or use, the necessary electronics to enable each to process information (i.e., compute) much faster than humanly possible and to exchange information with each other much faster than humanly possible. Each of the embodiments of the present invention cannot practically be implemented in any amount of time that would be acceptable to one skilled in the art using human beings as substitutes for the systems, devices, subsystems, subassemblies, and related methods described herein. For example, many of the embodiments described herein involve an exchange of information via two electronic components or between a user device and a network device that are remotely located from one another, where in each case the information exchanged must be available for immediate use for the computation of a message (e.g., related to weather conditions) or responsive signal. Accordingly, the speeds at which the information is exchanged and then used to make a computation, and the amount of information exchanged and computed is many times faster and larger than can be communicated and processed by the human mind in any reasonable amount of time. Said another way, such information cannot be processed by the human mind or mechanical means (pen and paper) within the time periods demanded by users of the present invention and those skilled in the art of the present invention.

As used herein, the term "embodiment" refers to one example of the present invention.

Referring now to FIG. 1 there is depicted an inventive, weather collection network 100 comprising one or more dynamic, micro-climate collection groups (hereafter "group" or "groups") $G_1, \ldots G_n$, where "n" indicates the last group. In accordance with embodiments of the invention, each dynamic micro-climate collection group may comprise one or more collection systems 20a-n, 30a-n or 20a-n', 30a-n' and one or more active collection devices 31a-n, 31a-n' (where "n" indicates the last such device). In FIG. 1 there is depicted groups, $G_1$ to $G_n$. Rather than repeat the description that follows for each group $G_1$ to $G_n$, it should be understood that when a feature, function or process involves systems 20a-n, 30a-n, substantially the same features, functions and processes may be completed by systems 20a-n', 30a-n'. Similarly, when a feature, function or process involves devices 31a-n, substantially the same features, functions and processes may be completed by devices 31a-n'. Further, when the following discussion describes the formation of one or more dynamic, micro-climate collection group it should be understood that systems 20a-n, 30a-n and 31a-n represent all of the systems and devices within network 100, including systems 20a-n', 30a-n'. and 31a-n'.

In one embodiment, each inventive system may comprise a single passive collection device 20a (e.g., an umbrella) communicatively paired with a single device 30a (e.g. a smartphone) that is capable of both passively and actively collecting weather-related information while each inventive active collection device 31a-n may comprise a smartphone, personal digital assistant (PDAs), wireless phone, laptop, tablet, or other mobile computing device.

In an embodiment, as indicated above, to form a collection system each of the devices 20a-n (e.g., umbrellas) may be communicatively "paired" with one or more of the devices 30a-n (smartphones) using means and processes known in the art (e.g. an APP and Bluetooth transceivers). When so paired, the passively collected, weather-related information from device 20a (umbrella) may be transmitted to a correspondingly paired device 30a (smartphone). Thereafter, the device 30a may subsequently transmit the passively collected information from device 20a to server 40 and/or computing system 50. In addition, any actively collected, weather-related information that is, for example, input by a user into device 30a may also be transmitted to server 40 and/or computing system 50. In addition, any actively collected, weather-related information that is, for example, input by a user into device 31a-n (e.g. smartphone) may also be transmitted to server 40 and/or computing system 50. As a result the system 50 may receive both passively-collected, weather-related information and actively collected, weather-related information.

The server 40 may comprise a network or central hardware server 40 which may be connected to a database 41. It should be understood, that while only a single server and database are depicted that this is merely exemplary. In alternative embodiments, the server 40 may comprise a plurality of servers and the database 41 may comprise a plurality of databases, for example. More particularly, in an illustrative embodiment the server 40 may comprise a web server operable to complete the functions, features and processes described herein as well as infrastructure features, functions and processes (e.g., issuing user credentials, user authentication, and data encryption).

The server 40 may be operable to exchange and/or store registration, authentication, data (including content) and signaling with devices 30a-30n, 31a-n within each group $G_1$ to $G_n$ using known electronics, methods and techniques via communications channels 21a-n (where "n" is the last channel). That is to say, each of the devices 30a-30n, 31a-n, 40 and 41 include components known to those skilled in the art to complete the functions and processes for exchanging registration, authentication, data (including content) and signaling information with one another.

The database(s) 41 may be operable to store, for example, current and historical passively or actively collected, weather-related information received by the connected server 40 from the systems and devices within each group $G_1$ to $G_n$ as well as the results of any computation or analysis (e.g., forecast) completed by the weather computing system 50.

Yet further, FIG. 1 also includes the weather computing system 50 referred to above. Such a system may include one or more hardware servers and other computing devices that are operable to: (1) form or re-form the composition of the groups $G_1$ to $G_n$, (2) aggregate passively and actively collected weather information received from systems 20a-n, 30a-n and devices 31a-n within each group (via server 40), (3) complete weather-related computations based on the passively and actively collected weather information, sometimes in conjunction with stored historical information, and, thereafter, provide the computations (e.g. forecasts) to devices 30a-30n, 31a-n (via server 40) or to devices that are not a part of a group $G_1$ to $G_n$, but have subscribed to receive, or otherwise requested, such computations.

Though each device 20a-n within a group $G_1$ to $G_n$ may be communicatively paired with at least one device 30a-n within its respective group $G_1$ to $G_n$, it should be understood that each respective device 20a-n within a group may nonetheless be operable to communicate with additional devices 30a-n, 31a-n that a respective device 20a-n is not paired with. For example, device 20a (an umbrella) may communicate with communicatively paired device 30a (a smartphone) but also may communicate with a second device 30b (second smartphone), third device 31a, etc. that is within the transmission range of the transmitter of device 20a.

It should be further understood that each device 30a-n, 31a-n within one group, say group $G_1$, for example, may communicate with each other and, in addition, may communicate with devices 30a-n', 31a-n' within each other group $G_n$ directly (without first communicating with server 40, or system 50) or indirectly (by first communicating with server 40 or system 50).

As described in more detail herein, in an embodiment, to complete communications with one or more of the devices 30a-30n, 31a-n each device 20a-n may comprise a wireless Bluetooth transceiver (see component 2005B in FIG. 2K) (e.g., one or more 802.11 versions/formats) or wired means (e.g., USB, Ethernet, HDMI, etc.) to establish a communications channel(or channels) with a respective device 30a-n, 31a-n. Each device 30a-n, 31a-n may be operable to store one or more APPs or instructions, for example, used to complete the functions, features and processes described herein, including receiving communications and weather-related information from a device 20a-n.

Before presenting a discussion of the operation of an exemplary passive system 20a-n, and 30a-n or an active device 31a-n, we first present a discussion of how the exemplary weather computing platform 50 may form the dynamic, micro-climate collection groups $G_1$ to $G_n$. Before that, however, we note that while the weather computing system 50 and server 40 are depicted in FIG. 1 as being separate, functional components, in an alternative embodiment the functions of the server 40 may be combined into the system 50, for example, or vice-versa.

In an embodiment, the weather computing system 50, or alternatively the server 40, may be operable to form one or more dynamic, micro-climate collection groups, such as groups $G_1$ to $G_n$ in FIG. 1. For purposes of the following discussion we will use the system 50 as the primary system for forming dynamic, micro-climate collection groups though it should be understood that the same or similar discussion applies to the server 40 (or for any other system, device that is configured to form such groups).

To form an exemplary group, the system 50 may be operable to receive geospatial information concerning each paired system 20a-n, 30a-n (e.g., umbrella and smartphone) and device 31a-n (e.g. smartphone) in network 100, including, but not limited to, their geographical location and topology of the area surrounding each system 20a-n, 30a-n and device 31a-n. This information may be provided to the system 50 by a device 30a-n within each system and by each device 31a-n (via server 40), or may be provided to the weather computing system 50 by other means, such as a separate geospatial database and server, or separate GPS database and server, for example.

In addition, as indicated previously, the system 50 may be operable to: (1) receive current, passively and actively collected weather-related information from each system 20a-n, 30a-n in real-time and current, actively collected weather information from devices 31a-n, (2) retrieve or receive historical geospatial information related to the devices 20a-n, 30a-n from database 41 or another similar data storage device, and (4) retrieve or receive historical, actively or passively collected weather-related information that was previously received from each of the systems 20a-n, 30a-n and devices 31a-n.

Upon receiving and/or retrieving the information discussed above the system 50 may be operable to group one or more of the systems 20a-n, 30a-n and devices 31a-n into a dynamic, micro-climate collection group in real-time by, for example, identifying one or more common characteristics among the received and retrieved information. In more detail, one example of a common characteristic may be the same or substantially the same, current geospatial information. Thus, in one embodiment the system 50 may be operable to group those systems 20a-n, 30a-n and/or devices 31a-n within network 100 that currently have the same or substantially the same geospatial information into the same dynamic, micro-climate collection group. Said another way, in one embodiment the system 50 may form a dynamic, micro-climate collection group by including in such a group only those systems 20a-n, 30a-n and devices 31a-n that are currently located in the same geospatial plane (e.g. same geographical area, same elevation and same topology). By grouping together those systems and devices that are currently associated with the same, or substantially the same geospatial information, in one group helps to insure that the weather related information that is received by weather computing system 50 from such systems and devices reflects the actual weather conditions currently occurring within such a geospatial plane. This, in turn, helps increase the reliability of the received weather-related information. In the embodiment depicted in FIG. 1, the system 50 may have formed systems 20a-n, 30a-n and devices 31a-n in group $G_1$ based on the fact that each of the systems 20a-n, 30a-n and devices 31a-n are associated with the same or substantially the same geospatial information.

In addition to geospatial information, the system 50 may apply one or more rules to form a dynamic, micro-climate collection group. For example, to insure that the weather-related information of a given group is statistically reliable, the system 50 may require that a group include a minimum (threshold) number of systems 20a-n, 30a-n and/or devices 31a-n that currently are associated with the same or substantially the same geospatial information. Conversely, the system 50 may require that a group not contain a total number of systems 20a-n, 30a-n and devices 31a-n that are associated with the same or substantially the same geospatial information that exceeds a maximum (threshold) number in order to, for example.

In an embodiment, if the system 50 determines that the number of systems 20a-n, 30a-n and/or devices 31a-n associated with a common characteristic, such as the same or substantially the same geospatial information, exceeds a maximum, threshold number, then the system 50 may be operable to form an additional group that contains the systems and devices that are among the number of devices that exceed the maximum threshold. Conversely, if the system 50 determines that the number of systems and/or devices 20a-n associated with a common characteristic, such as the same or substantially the same geospatial information, is less than a minimum threshold number, then the system 50 may either decline to form a group with such systems and/or devices, or, alternatively, assign the system and/or devices to a group that contains different systems 20a-n,30a-n and/or 31a-n devices whose geospatial information may not be substantially the same as the assigned devices but may comprise adjacent geospatial information (i.e., devices that are not in the same geospatial plane, but are nearby, or as close as possible to, such a plane).

It should be understood that the system 50 may be operable to continuously receive geospatial information concerning all of the systems 20a-n, 30a-n and devices 31a-n within network 100. Thus, as time passes and a given system 20a-n, 30a-n or device 31a-n moves from one geospatial area to another, for example, their movement will be reflected in new or updated geospatial information. Because a system 20a-n, 30a-n or device 31a-n may be associated with different geo-spatial information, it may no longer share a common geo-spatial characteristic with the existing members of its group. Accordingly, the system 50, on determining that the so-moved system 20a-n, 30a-n or device 31a-n is indeed associated with new geo-spatial information that is substantially different from the geo-spatial information of the other members of its existing group, may be operable to remove the so moved system 20a,n 30a,n or device 31a-n from its existing group and place it (assign it) into another, existing group whose geospatial characteristics are substantially the same as the new characteristics of the so moved system 20a-n, 30a-n or device 31a-n. This is process may be continuously repeatedly for each system 20a,n 30a,n and device 31a-n that is part of the network. Thus, the composition of a group may be constantly changing over time, making it very dynamic.

Because the weather computing system 50 and/or server 40 receives geospatial information concerning a system 20a-n,30a-n and/or device 31a-n that is moving, the system 50 and/or server 40 (hereafter referred to as "system 50" unless the context dictates otherwise) may be operable to determine the direction (path) of a system or device (e.g., direction, elevation and speed of such a moving system or device) upon combining the original and new geospatial information along with time information (e.g., time elapsed between one geospatial position and another), for example. Further, based upon a computed direction and speed the system 50 may be able to provide the user of moving system 20a-n,30a-n and/or device 31a-n with the current or historical weather-related conditions for a geospatial position in the direction that the system or device is moving.

In the above discussion it was assumed that only a single system 20a-n,30a-n and/or device 31a-n within a formed dynamic, micro-climate collection group $G_1$ to $G_n$ was moving. Of course, more than one such system or device may be moving. Accordingly, the system 50 may be operable to compare the geospatial information for each of the so-moving systems and devices, and if some (or all) of the moving systems 20a-n, 30a-n and/or devices 31a-n, move in substantially the same direction, at substantially the same speed at substantially the same time, then their geospatial information at a given moment in time that is received and/or computed by the system 50 may also be substantially the same. Accordingly, the weather computing system 50 may be operable to determine that those systems and devices that have substantially the same geospatial information may remain in the substantially same group in real-time, for example.

In the embodiments above, the weather computing system 50 was described as using geospatial information and/or a minimum/maximum number of systems 20a-n,30a-n and/or devices 31a-n as information to form a dynamic, micro-climate collection group. However, the system 50 may utilize other information it receives from a system 20a-n, 30a-n and/or device 31a-n, of from another information source (e.g., historical information from its database 41) separately, or in combination with, geospatial information and/or a minimum/maximum number of systems and/or devices to form a dynamic, micro-climate collection group $G_1$ to $G_n$.

For example, the system 50 may vary the physical size of the geographical area that is used to form a group. Said another way, the system 50 may enlarge or shrink the area within which a number of systems 20a-n, 30a-n and/or devices 31a-n are found or may be found. Thus, the size of the physical area and the geospatial information of such an area may be the common characteristic that the system 50 may use to form a dynamic, micro-climate collection group.

Other information may be used to form a group as well. In yet another embodiment, the system 50 may be operable to compute the reliability of weather-related information received from a particular system 20a-n,30a-n and/or device 31a-n in real-time and use this reliability information as the common characteristic alone, or in combination with one or more other common characteristics, to form a dynamic, micro-climate collection group $G_1$ to $G_n$.

In an embodiment, the weather computing system 50 may utilize a "smart reporting" process to determine the reliability of weather-related information it receives in a passive or active manner from a given system 20a-n, 30a-n and/or device 31a-n at a given moment in time. For example, upon receiving weather-related information from a specific system 20a-n, 30a-n or device 31a-n the weather computing system 50 may be operable to compare that information with other information it is receiving from other systems and/or devices within the same group or associated with substantially the same geospatial information in real-time (e.g., in the same area). In addition, or in conjunction with the above process, the system 50 may be operable to compare the current weather-related information received from a specific system and/or device to stored, historical weather-related information to determine the reliability of the current information. In any event, if the weather computing system 50 determines that the current weather-related information from a specific collection system or device is not consistent with the weather information received from other nearby weather collection systems and/or historical information than the information from the specific collection system or device may be disregarded.

At any point in time the system 50 may have formed, and stored, any number of dynamic, micro-climate collection groups. Thereafter, the system 50 may be operable to provide the current or historical, stored weather-related information, among other information, that it has also received that is associated with each formed group $G_1$ to $G_n$ and each system 20a-n, 30a-n and/or device 31a-n within a group $G_1$ to $G_n$ to any system 20a-n,30a-n or device 31a-n within the network 100 and/or to subscribers that request such information but are not a part of the network 100, for example.

One example of a subscriber that may not be a user of a system 20a-n, 30a-n, or device 31a-n within network 100, yet be interested in the weather-related information associated with the dynamic, micro-climate collection groups, is a meteorologist.

In embodiments of the invention, weather-related information associated with a group $G_1$ to $G_n$ may be used as a part of one or more services, such as a Weather-As-A Service (WAAS), for example.

In an embodiment, a meteorologist or other individual may be interested in retrieving some of the stored weather-related information from system 50 that corresponds with specific geospatial location(s). Accordingly, the operator of the network 100 may offer a service that allow such an individual access to stored weather-related information and other information for a fee, Such an individual may be referred to as a "subscriber" and such a service may be referred to as WAAS.

In more detail, in one embodiment a subscriber or an agent of the subscriber (i.e., in reality a computing device used by a subscriber or his/her agent), after completing an authentication process to verify the subscriber's identity as a valid subscriber, may then make a request using an API to the system 50 or whatever system that is storing the weather-related information within network 100 in order to retrieve such information. One exemplary API may include an identification of a geospatial polygon (that includes a geographical area) that is of interest to the subscriber.

Upon receiving the response from the API, the system 50 may be operable to (a) identify the geographical areas associated with the polygon, and (b) retrieve and forward the weather-related information that corresponds to the polygon to the subscriber or agent.

It will be appreciated by those skilled in the art that the ability to retrieve weather-related information for specific geospatial polygons (e.g., specific geographical areas, elevations, topographies) improves the ability of a meteorologist, for example, to provide accurate weather information (e.g. forecasts) for specific geographical areas. In particular, some geographical areas are remote from an established network of weather radars and collection stations (e.g., a National Oceanic and Atmospheric Administration station or tower). Accordingly, the farther a location is from a weather radar, the harder it is for the station to collect accurate weather-related information from such a remote area and provide accurate weather forecasts for such an area. In sum, the weather-related information that corresponds to the remote location may be unavailable or, if available, may be inaccurate.

However, to the extent that a remote area may be substantially contained within one or more computed and formed dynamic, micro-climate collection groups $G_1$ to $G_n$, the system 5 may be operable to provide the weather-related information that is associated with the remote area to a subscriber so that, for example a subscriber-meteorologist can provide accurate weather forecasts, for example for such a remote area.

It should be understood that weather-related information is just one of many types of information (i.e., data) that can be requested by a subscriber. For example, a subscriber may also request, and the weather computing system 50 be operable to provide, information concerning the number of systems 20a-n,30a-n or devices 31a-n within a given geographic area or areas, the number of systems 20a-n,30a-n and/or devices 31a-n that are in an open and/or closed status, the number of systems 20a-n,30a-n and/or devices 31a-n that may be in an "IDLE" state, and geospatial path metrics. It should be further understood that the system 50 may be operable to provide such information to a subscriber upon receiving a response via an API or equivalent request.

Regarding the geospatial path metrics, in an embodiment these may be historical metrics of the number of systems 20a-n, 30a-n and devices 31a-n within a given geographical area at a given time of day, for example. Data can be aggregated over the course of a given day of the week, for example, to illustrate the movement of the devices 20a-n (and their users). This is believed to be valuable information for meteorologists who seek to provide relevant weather-related information to those users within predictable areas traveling predictable paths at predictable times of the day and days of the week. For example, it may be more valuable to provide a weather forecast to commuters who are traveling through predictable areas using predictable paths at predictable times of the day than, perhaps, to those individuals who are not commuting over predictable paths at predictable times of the day.

Figure 2A:
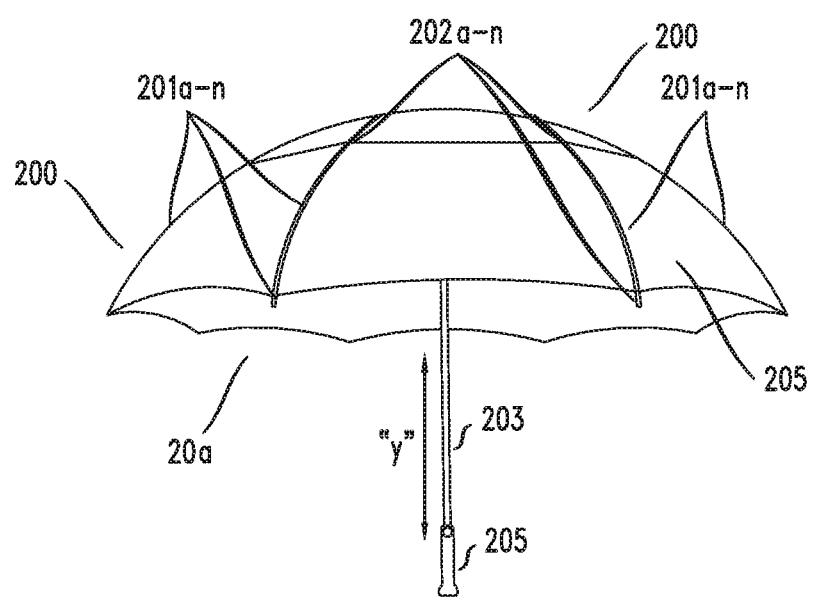
FIG. 2A depicts an exemplary device that is part of the network in FIG. 1 according to an embodiment of the invention.

Referring now to FIG. 2A there is depicted an exemplary passive weather collection device 20a (e.g., inventive umbrella) that may be part of a group $G_1$ to $G_n$ within the network 100 in FIG. 1 according to an embodiment of the invention. As depicted the device 20a may comprise a plurality of movable ribs 201a-n (where "n" is the last rib), reinforced joints 202a-n (where "n" is the last joint) connecting the ribs 201a-n to a plurality of runners 208a-n (see FIG. 2F), an adjustable structure 203 (e.g., shaft) connected to the plurality of runners 208a-n (see Figure F and operable to move in accordance with a force applied to it to along an axis "Y" to expand or contract the surface area of a covering 200 (e.g., a canopy, i.e., open or close the canopy), a structural support means 204 (e.g., an inventive handle) for supporting and stabilizing the structure 203 that is used to control the opening and closing of the ribs 201a-n and providing means for a person to hold the entire device 20a. In an embodiment of the invention, the covering 200 includes a section that is devoted to an electronic tracking element 205 that is discussed in more detail elsewhere herein.

In more detail, the ribs 201a-n may comprise a 4-millimeter-thick gauge fiberglass material. This type and amount of material provides strength to the ribs to reduce the potential for malfunctioning (i.e., breakage, inversion of the ribs during high winds, etc.), though it should be understood that other configurations (i.e., dimensions, amounts and material types) may be used provided the same or similar degree of strength results.

To further reduce malfunctioning of the device 20a, one or more of the joints 202a-n have been configured to be located at positions around the covering 200 that provide additional strength. For example, while existing, typical umbrellas position joints approximately in the middle of a rib, the present invention provides for embodiments where the joints 202a-n are positioned closer to the top or point of the umbrella 20a. In one embodiment, the joints 202a-n are positioned 10 centimeters closer to the top or point of the umbrella 20a than joints of existing umbrellas.

In experiments completed by the inventor, the ribs 201a-n, joints 202a-n, runners 208a-n (see FIG. 2F) and covering 200 demonstrate a wind resistance of up to 25 meters per second (i.e., 55 miles per hour).

In an embodiment of the invention, the covering 200 may comprise, for example, a 5-degree pongee fabric (e.g., a soft, thin woven cloth or silk) that substantially, completely repels water (i.e., is fast-drying) or a similar material that provides similar protection at a plurality of angles of precipitation (i.e., angle that precipitation impinges on the covering 200). In an embodiment, the ribs 201a-n, joints 202a-n, runners 208a-n and covering 200 are configured such that the covering 200 may be bent downwards from a horizontal plane to a greater degree than existing umbrellas.

Figure 2B:
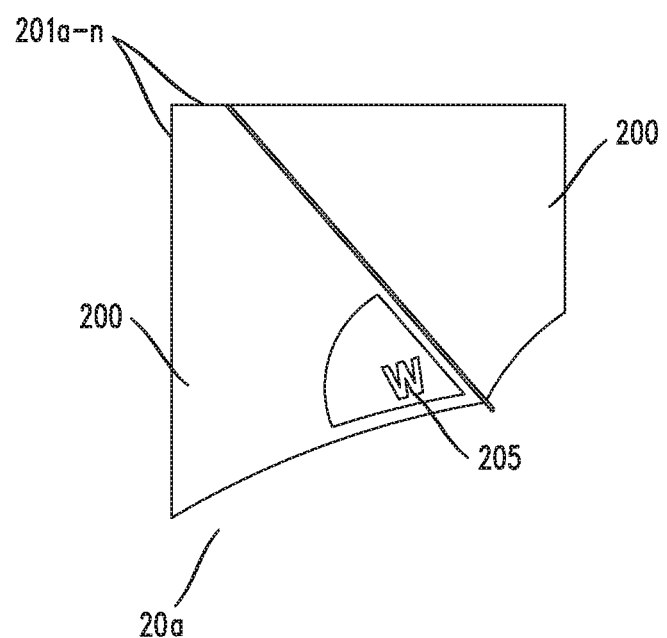
FIG. 2B depicts a sectional view of an element of the exemplary device in FIG. 2A according to an embodiment of the invention.
Figure 2C:
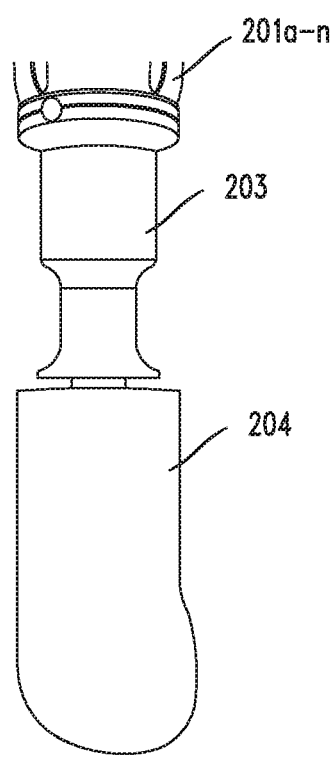
FIG. 2C depicts another sectional view of a different element of the device depicted in FIG. 2A according to an embodiment of the invention.
Figure 2D:
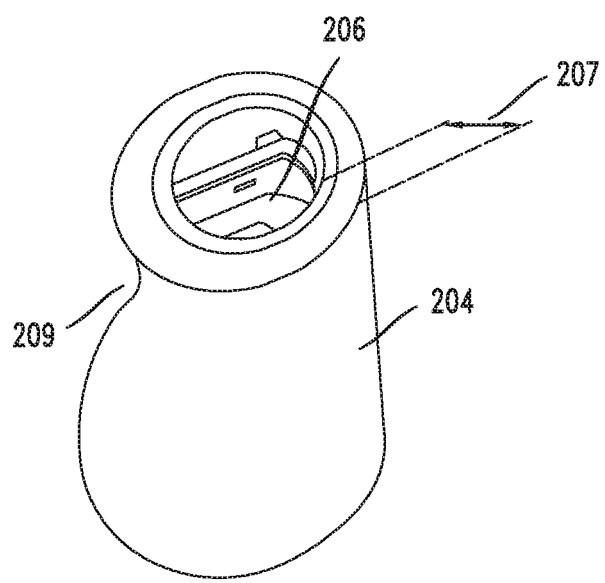
FIG. 2D depicts another view of the element depicted in FIG. 2C according to an embodiment of the invention.
Figure 2F:
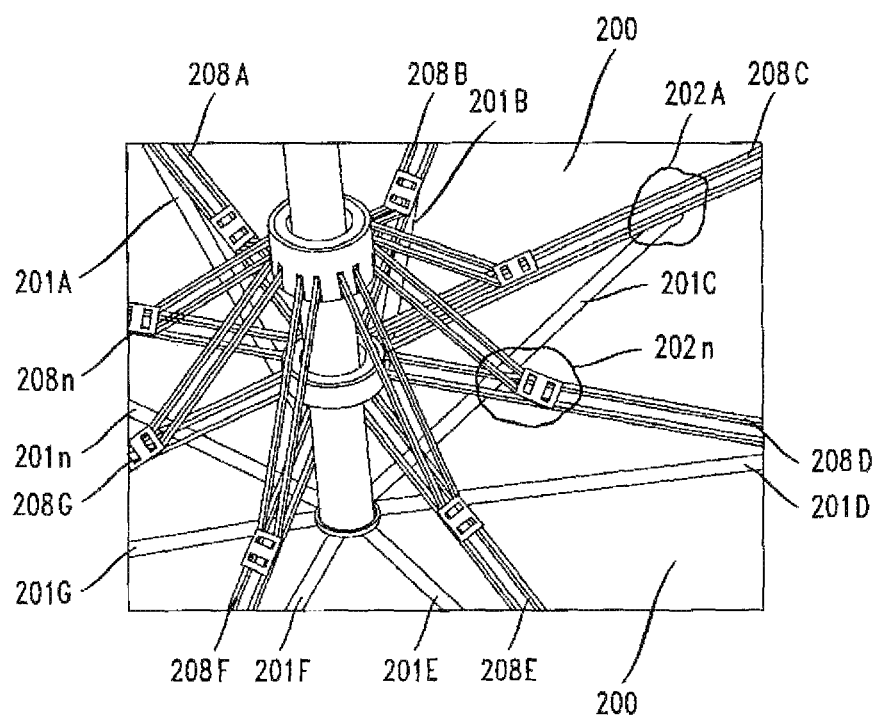
FIG. 2F depicts the underside of an exemplary device (e.g., an umbrella) according to an embodiment of the invention.
Figure 2G:
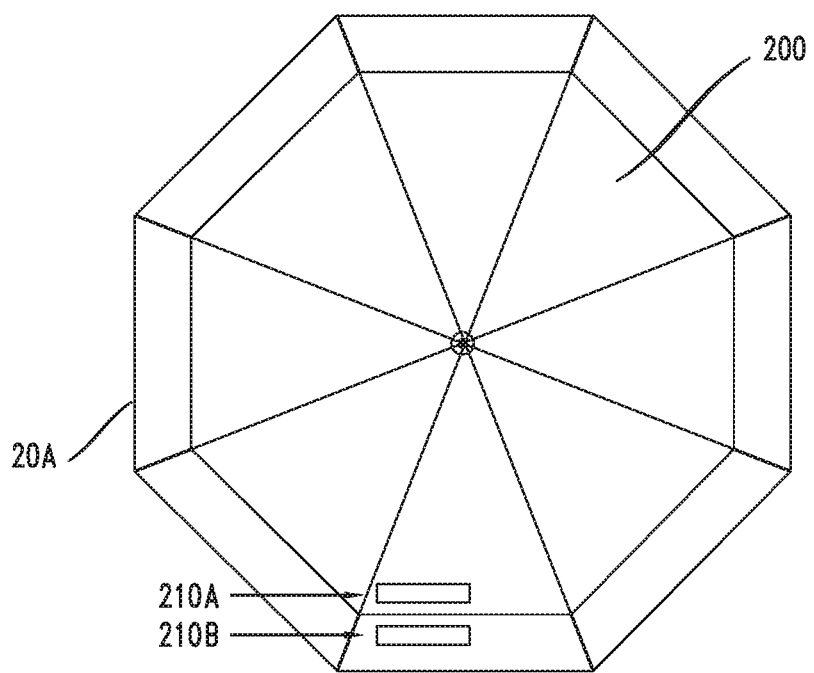
FIGS. 2G and H depict additional views of an exemplary device according to embodiments of the invention.
Figure 2H:
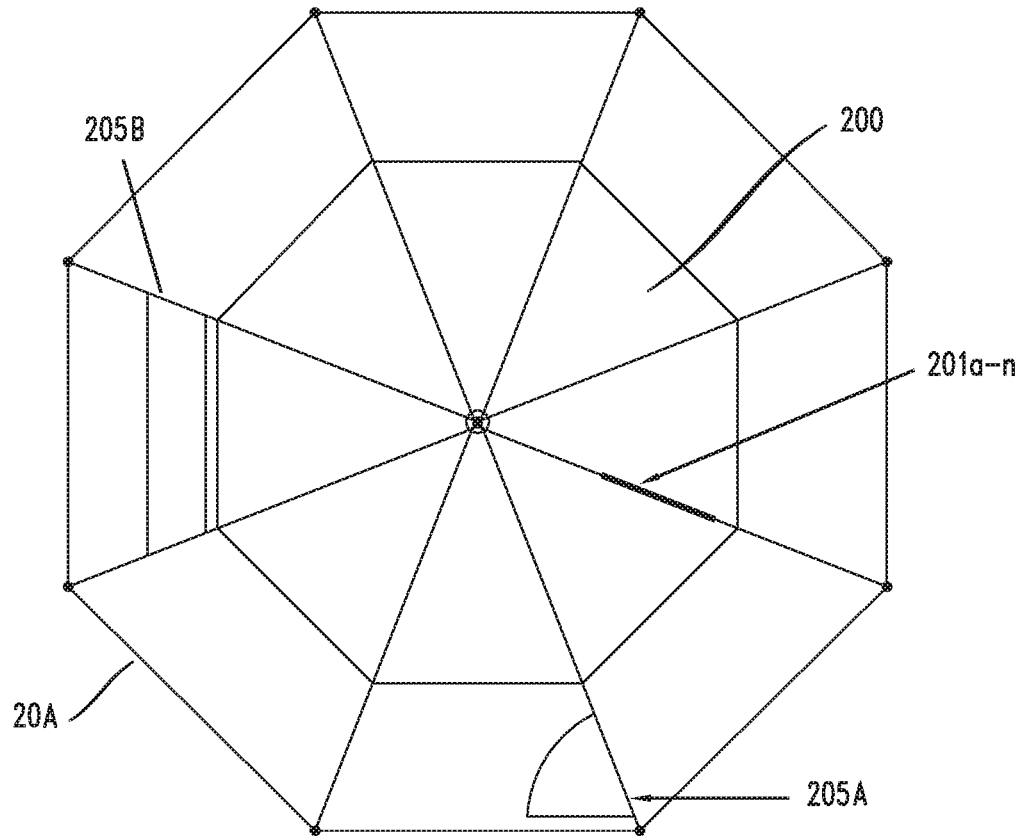
FIG. 2E depicts exemplary dimensions for an element of an inventive device according to an embodiment of the invention.
FIGS. 2I, 2J and 2K depict an exemplary subsystem of an exemplary device according to an embodiment of the invention.
FIGS. 2L and 2M depict an inventive closure subsystem according to an embodiment of the invention.
FIGS. 2N through 2Q depict an exemplary locking subsystem in accordance with embodiments of the invention.
Figure 21:
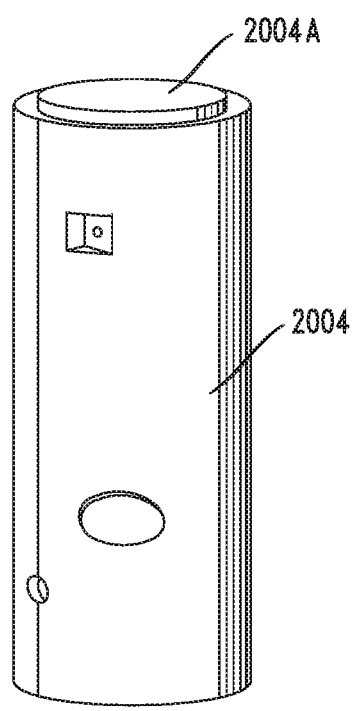
Figure 2J:
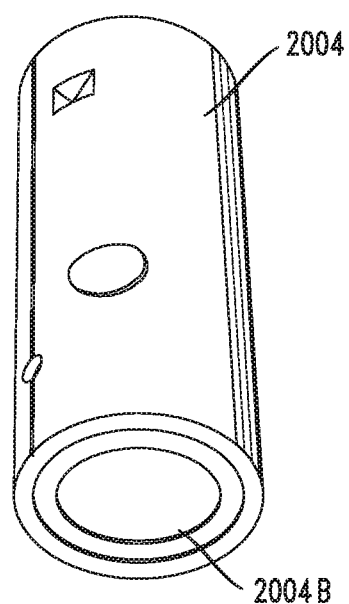
Figure 2K:
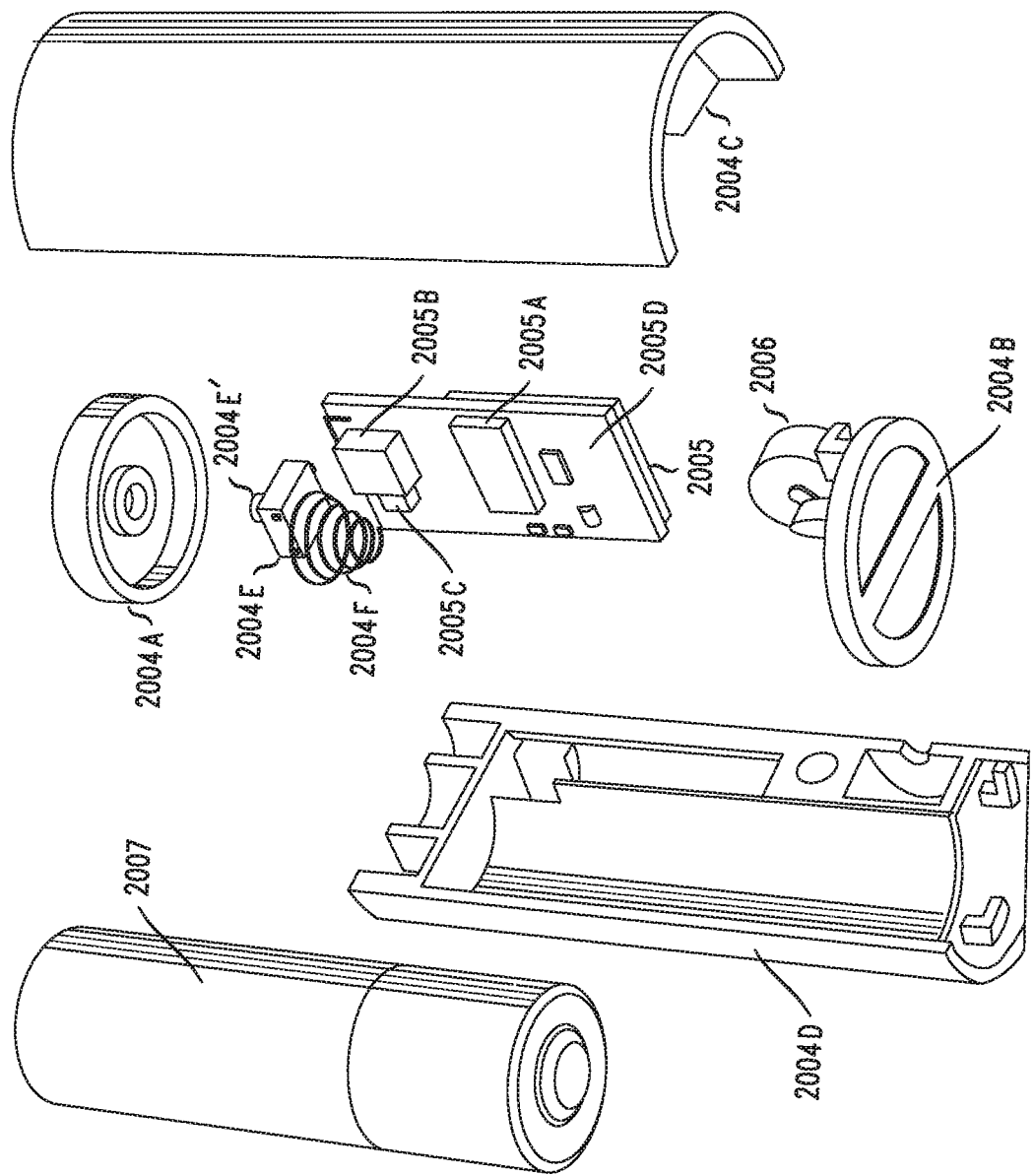

Referring now to FIGS. 2I through 2K there is depicted an exemplary, removable subsystem 2004. In embodiments, the subsystem 2004 may be inserted into, or fit within, the structure 204 (e.g., handle). When desired, the subsystem 2004 may be removed from the structure 204 for repair, replacement, etc. FIG. 2I depicts a top view of the subsystem 2004 where a depressible switch plate or "button" 2004a is depicted while FIG. 2J depicts a bottom view of the subsystem 2004 where a removable cover 2004b is shown. In an embodiment, the subsystem 2004 may be powered by a DC battery (e.g., 1.5 volts, 2000 milliAmphours (3000 mWh)) that is enclosed within the subsystem 2004 (see FIG. 2K). To access the battery, a user may remove the cover 2004b by turning it, for example. Further, the subsystem 2004 may include a mesh (not shown in figure) that functions to substantially surround the subsystem 2004, allow air into the subsystem 2004 but prevent liquid (e.g., water) from entering subsystem 2004. It should be noted that allowing air to enter the subsystem 2004 is necessary for sensing atmospheric weather conditions, as explained in more detail elsewhere herein.

FIG. 2K depicts an exemplary, exploded view of the subsystem 2004. As shown, the subsystem 2004 may comprise two mated coverings or shells 2004c,d it being understood that a one piece covering could replace the two separate shells 2004a,b. Both embodiments function to protect the electronic and electromechanical components that may be included in the subsystem 2004 within the covering or coverings 2004c,d.

For example the electromechanical components may comprise switch 2004e, compressible means 2004f (e.g., a spring), audible generation means 2006 (e.g., a buzzer) while the electronics may comprise electronic subassembly 2005. As just discussed, the subsystem 2004 may include a DC battery 2007. In an alternative embodiment, the battery 2007 may be a rechargeable battery.

In an embodiment, the components within subsystem 2004 may function to: (1) detect the opening and closing of the device 20a; (2) use the signals from (1) to generate data that can be used for accurately identifying weather conditions where the device 20a is located when it is in an open or closed position, for example; (3) passively sense a plurality of weather conditions at the location where the device 20a is presently located; (4) collect data related to items (1) through (3) and (5) communicatively exchange (e.g., transmit and receive) the data and associated signaling with a paired device 30a-n or with another device 31a-n, with server 40 and/or weather computing system 50 and (6) emit audible signals and (7) generate a signal indicating the power level of the battery 2007 is low.

Figure 2L:
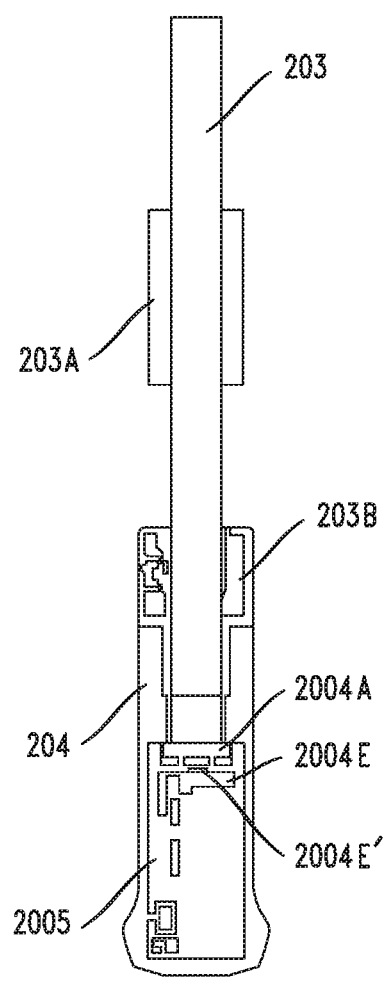
Figure 2M:
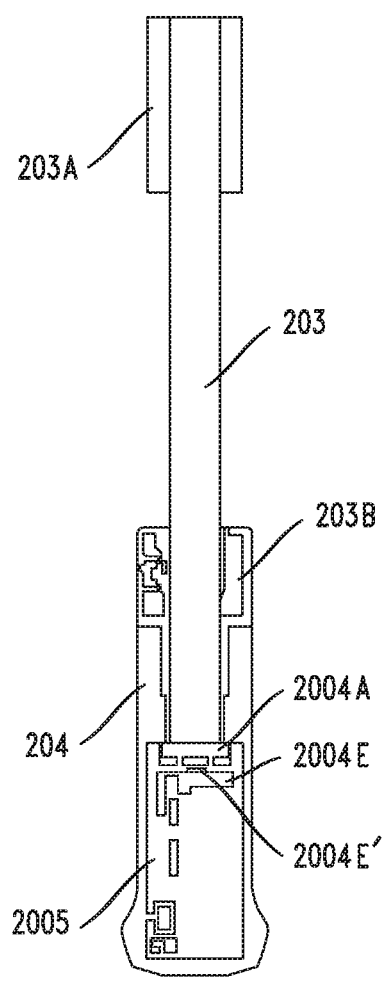
Figure 2N:
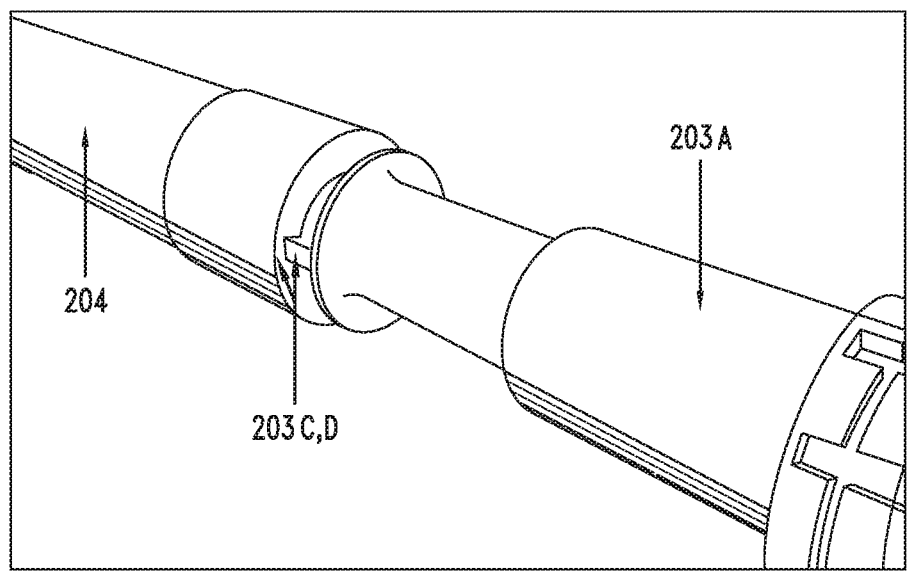
Figure 2O:
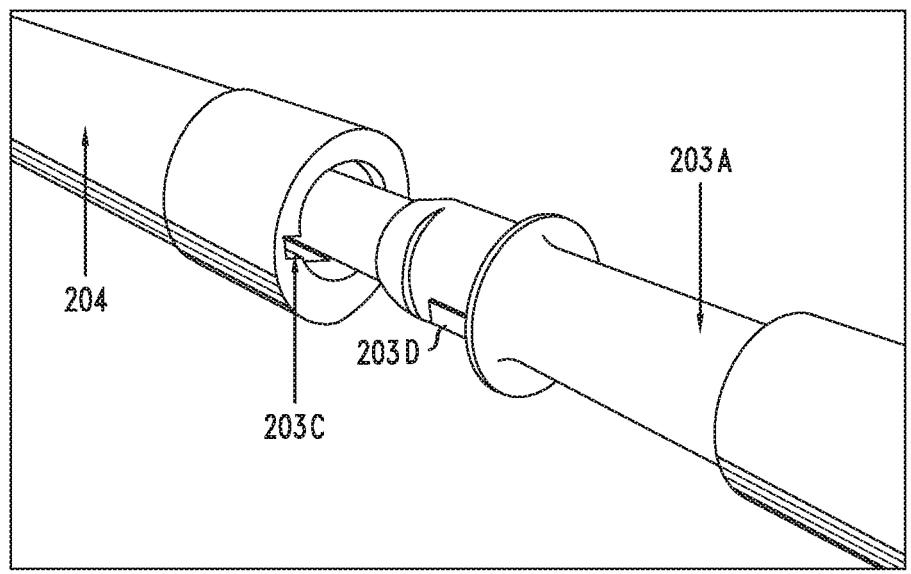
Figure 2P:
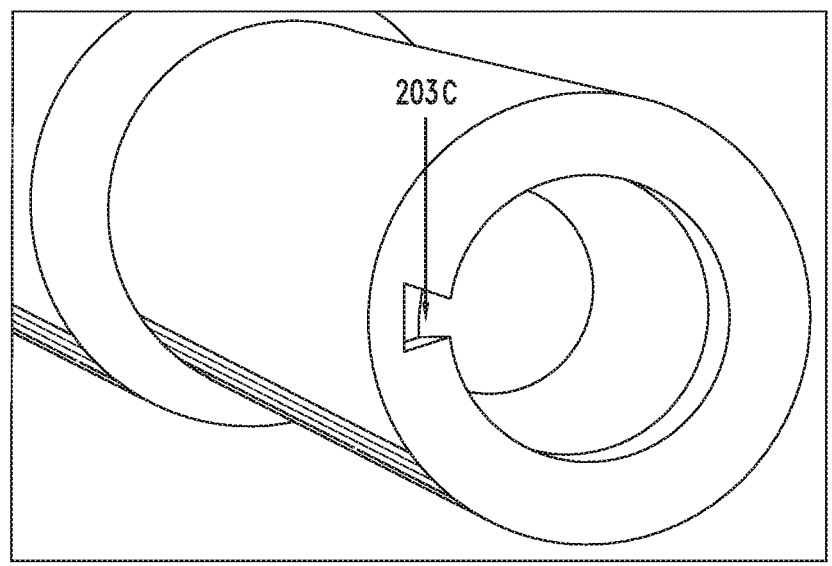
Figure 2Q:
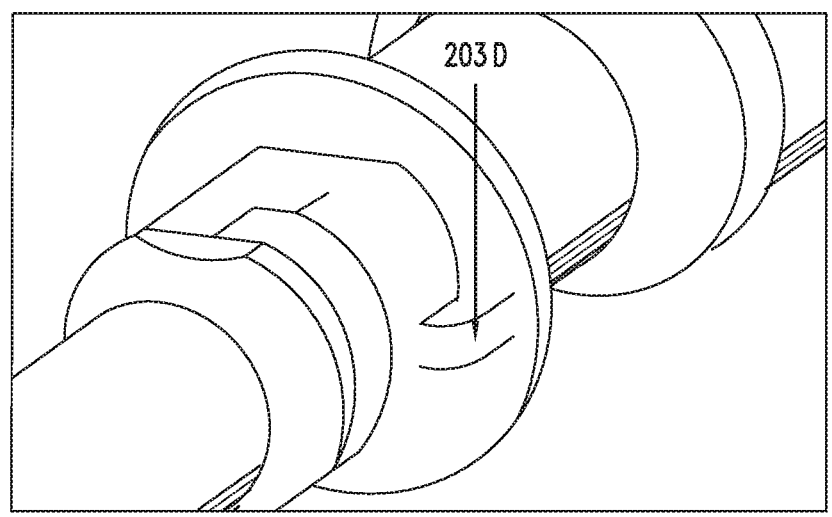

In more detail, to close the device 20a, (see FIG. 2L) the support structure 203 may be moved to a position that functions to collapse the ribs 201a-n in a means known in the art. In addition, in an embodiment, as the structure 203 moves a correspondingly connected runner 203a (see FIG. 2L) may contact the switch plate 2004a. Such contact functions to apply a force to the switch plate 2004a that, for example, depresses the switch plate 2004a in a direction towards a movable (e.g. depressible) probe 2004e' that is connectibly attached to the switch 2004e (in fact, it may be an integral part of the switch 2004e). In an embodiment, as the switch plate 2004a is depressed further it applies a force to the probe 2004e' that forces the probe 2004e' through to the internal portion of the electromechanical switch 2004e. In an embodiment, the switch 2004e may function to generate an electrical signal as the probe 2004e' makes contact with the internal elements within the body of the switch 2004e. This signal indicates the device 20a has been substantially closed. It should be understood that the switch 2004e and probe 2004e' may be an integral component, for example. Conversely, referring now to FIG. 2M, as the device 20a is opened the support structure 203 may be moved to a position that functions to expand the ribs 201a-n in a means known in the art. In addition, in an embodiment, as the structure 203 is moving the correspondingly connected runner 203a may break its contact (i.e., move away from) the switch plate 2004a. The lack of such contact functions to remove the force applied to the switch plate 2004a that, for example, allows the switch plate 2004a to expand or move in a direction away from the movable (e.g. depressible) probe 2004e'. In an embodiment, as the switch plate 2004a removes the force being applied to the probe 2004e', the probe 2004e' moves out of contact with internal elements within the switch 2004e. In an embodiment, the switch 2004e may function to generate a second electrical signal as the probe 2004e' looses contact with the internal elements within the body of the switch 2004e, This second signal indicates the device 20a has been substantially opened.

In an embodiment the runner 203a may comprise a nylon material, for example.

In an embodiment, the signals generated by the switch 2004e may be sent to the electronic subassembly 2005. Though not shown in FIG. 2K it should be under stood that the switch 2004e may be physically and electrically connected to the subassembly 2005 using means known in the art such as soldering the switch 2004e to electrical conductors (not shown in FIG. 2K) that are part of a printed circuit board or other supporting structure 2005e. The signals from the switch 2004e may travel via the conductors to the microcontroller 2005a, for example.

Referring now to FIGS. 2N through 2Q there is depicted an exemplary locking subsystem 203c,d for locking the shaft 203 of the device 20a (e.g., an umbrella) in a closed position. As depicted, the locking system 203c,d may comprise a non-square shaped (e.g., V-shaped) "lock" slot, or groove 203c (see FIGS. 2P,2Q) and a non-square shaped, elongated (e.g. V-shaped) "key" that is configured to fit into the groove 203c forming a combination lock and key arrangement. As will be appreciated by those skilled in the art, the non-square shaped configuration of the system 203c,d functions to secure the key 203d within the lock 203c when stresses or forces are applied to the shaft 203, for example. In existing systems, particularly those that use squared shaped lock and key configurations, a rotational force may be enough to dislodge a square-shaped key from a square-shaped lock (groove) thus causing an inadvertent release of the shaft 203 and opening of an umbrella. The inventive system 203c,d significantly reduces such inadvertent openings, among other things.

Turning now to the subassembly 2005, in an embodiment it may include the microcontroller 2005a, wireless transceiver 2005b (e.g. Bluetooth low-energy transceiver), weather sensors 2005c all of which may be supported by structure 2005d (e.g., printed circuit board). In an embodiment the structure 2005d includes conductors (not shown in FIG. 2K) for electrically (and, or optically) connecting components 2005a, 2005b and 2005c (among other components). Components 2005a to 2005c may be physically and electrically connected to the conductors using soldering, for example.

Turning first to the weather sensors 2005c, in an embodiment these sensors may be operable to sense a plurality of weather-related parameters from air that is allowed within the subsystem 2004, for example. Such parameters include temperature, humidity and barometric pressure, for example. Thereafter, signals representing a value of a sensed parameter may be sent to the microcontroller 2005a for further processing and computation. Alternatively, the signals may be sent to the transceiver 2005b. In an embodiment, the transceiver 2005b may be operable to receive such signals and transmit the signals as weather-related information to a device 30a-n, 31a-n, server 40 or to the weather computing system 50, for example.

It should be understood that the sensors 2005c may repeatedly detect the one or more weather-related parameters every few seconds, for example, and send associated signals representing the value of the so-detected parameters to the microcontroller 2005a. However, in accordance with alternative embodiments the microcontroller 2005a may not send data representative of the values to the transceiver 2005b every few seconds. Rather, the microcontroller may be operable to send such data to the transceiver 2005b every few minutes (e.g., 1-3 minutes).

In embodiments of the invention both the microcontroller 2005a and sensors 2005c may be operable to execute instructions (e.g., firmware) stored in their electronic memory or another memory (not shown in FIG. 2K) that effectively controls or varies the time period between transmissions, from a few seconds to a few minutes, for example. Still further, the microcontroller 2005a may be operable to receive signals from a device 30a (e.g., a smartphone) via transceiver 2005b, where the signals may contain data that represents a time period that the user of device 30a wishes to have weather-related information (or other information, signals, values, data) transmitted to their device 30a or on to server 40 and/or weather computing system 50. In sum, the time period may be customized.

In an embodiment, the transceiver 2005b may comprise a Bluetooth transceiver that functions to transmit and receive signals to and from user device 30a-n, or 31a-n for example, in accordance with a Bluetooth BLE 4.2+ protocol/standard, for example. In an embodiment, the signals exchanged between the transceiver 2005b and device 30a,31a may be compatible with, and used by, an APP running on the user device 30a,31a. In addition to weather-related information the transceiver 2005b may be operable to transmit and/or receive a plurality of other signals/data, such as the status of the device 20a (i.e., open or closed), received signal strength indicator (i.e. an indication(s) of the signal strength of a signal transmitted from one of the devices 30a-n, 31a-n and device 20a, and information regarding the battery voltage of the device's 20a battery (see FIG. 2K, component 2007), for example.

As was mentioned previously, in addition to receiving values representative of weather-related parameters from sensors 2005c, the microcontroller 2005a may also receive device status signals—signals generated by the switch 2004e that indicate whether the device 20a is in an open or closed state. In yet a further embodiment, the microcontroller 2005a may be operable to compute the number of received signals that indicate the device 20a was opened and/or closed and store this computed, status number in its memory for transmission to a device 30a-n, 31a-n, server 40 and/or system 50 via transceiver 2005b.

Given that the device 20a may typically rely upon a DC battery 2007 for powering its operation, the inventors designed the subsystem 2004 such that it may, in one embodiment, operate in an energy-saving, low power mode that makes efficient use of the power supplied by the battery 2007. For example, an exemplary weather sensor 2005c may draw a current of 3.6 microAmps (maximum) at 3 volts (~10 microwatts of power) every 10 seconds, the microcontroller 2005a itself may draw (use) 800 microAmps at 3 volts (~2400 microwatts of power), and the transceiver 2005b may use 4000 to 4170 microAmps at 3 volts (~12000 microwatts of power) for an exemplary total of 14410 microwatts of 14.41 milliwatts of power.

Given the above power requirements it is estimated that the battery 2007 may supply power to the components of subsystem 2004 for approximately 208 hours.

Accordingly, to increase the time before the battery 2007 needs to be replaced or recharged the inventors provide for a low power mode. More particularly, the microcontroller 2005a may be operable to execute instructions stored in its memory (e.g., firmware) to operate the components of the subsystem 2004 in a low power mode by, for example controlling the time between transceiver transmissions (as explained above) and placing the sensors 2005c in an "idle mode". In such an idle mode the microcontroller 2005a may be operable to control the operation of the sensors 2005c such that they (a) only make sensed measurements of weather related parameters or (b) send signals, representative of the value of the so-measured weather-related parameters, in accordance with one or more pre-set time periods rather than make such measurements or send such values substantially continuously (e.g. every 10 milliseconds). In the time between such measurements or sending such values the sensors 2005c may require reduced power (i.e., may operate in a low power or "idle" mode). Yet further, an exemplary low power mode may also involve the microcontroller 2005a controlling the frequency and transmitted power of signals being transmitted from the transceiver 2005b, for example (e.g., transmit at lower powers and at different Bluetooth frequencies).

Nonetheless, there may be times when the power level of the battery 2007 is low. Realizing this, the inventors provide for exemplary subsystems 2004 that include a "low power" battery indicator that functions to alert a user of device 20a to change or charge the battery 2007. For example, the microcontroller 2005a may be operable to execute instructions stored in memory that control the output of an audible sound, tone or series of tones from the buzzer 2006 and/or control a visual means, such as turning an LED indicator "ON" when the power level of the battery is below one or more pre-set, stored threshold levels and turning the LED "OFF" when the power level exceeds one or more preset, stored threshold levels, for example.

In conjunction with the tracking features discussed elsewhere herein, or independent of such features, the subsystem 2004 may be operable to output an audible sound or visual indication that functions as an alert or notification that assists the user in locating the device 20a when the user is unsure of its location. More particularly, the microcontroller 2005a may be operable to execute instructions stored in memory that control the output of an audible sound, tone or series of tones from the buzzer 2006 and/or control a visual means, such as turning an LED indicator "ON" and "OFF" in a pattern, for example.

Referring now to FIG. 2B there is depicted a sectional view of the device 20a that focuses on the location of the tracking element 205 according an exemplary embodiment of the invention. As shown, the tracking element 205 may be located on underside surface of the covering 200, within a cavity 205a of the covering 200, such as a water-proof pocket in combination with a water-proof zipper that is heat sealed or other equivalent structure, for example. Though shown positioned at an edge section of the covering 200, it should be understood that device 20a may be configured such that the tracking element 205 may be located at another section of the covering 200, other than the edge. Alternatively, the device 20a may be further configured to include the tracking element 205 positioned on a different element of the device 20a other than the covering 200, such as on the shaft 203 or as a part of control means 204. For the sake of simplicity these embodiments are not shown in the figures.

After the tracking element 205 has been paired with one or more user devices 30a-n using means known in the art, a transceiver within the element 205 (not shown in FIG. 2B) may be operable to exchange signals with a communicatively paired user device 30a-n (e.g., a smartphone), the network server 40, another device 20b through 20n or an element within another personal weather network, for example. Further, in one embodiment the transceiver may generate Bluetooth formatted signals (e.g., Bluetooth 4.1 formatted signals) that may be received by a user device 30a (e.g., smartphone). Upon receiving the Bluetooth signal, the user device 30a may be operable to process the signals in order to compute the location of the device 20a (e.g., inventive umbrella), its distance from the device 30a, a suggested pathway or route to retrieve the device 20a, an address of the device 20a and a business or residential name associated with the address (e.g., a restaurant name, business/employer's office, home residence, etc.), for example. Alternatively, the computations may be made by the server 40, system 50 or another device 30b-n that has been linked to the device 30a, for example.

Referring now to FIGS. 2G and 2H there are depicted additional views of an exemplary, inventive device 20a (e.g., umbrella). As shown in the top view of FIG. 2G, the device 20a may include means for closing the umbrella 210a,b, for example, associated top and bottom closing straps 210a,b that may comprise mating Velcro strips, while in the bottom view of FIG. 2H the device 20a may include an additional cavity 205b or mesh pocket for carrying articles. Further, in an embodiment one or more of the ribs 201a-n may comprise a silicon coated surface that functions to provide a no-slip surface and to support one or more items, such as a golf towel for example.

In one embodiment, this information (as well as additional information, see for example FIGS. 3A and 3B) may be presented to the user of communicatively paired device 30a (who is presumably, but need not be, the owner of device 20a) on a display of the device 30a, for example. Yet further, in conjunction with, or separate from the presentation of such information, the device 30a may output one or more signals, such as an audible sound or pattern of sounds that may indicate the device 30a and/or its user is within a certain distance from the device 20a (e.g., umbrella).

The devices 20a-n, 30a-n, server 40 and system 50 may utilize (e.g., store and execute) one or more third party proprietary processes to complete one or more functions and features described herein or equivalent features and functions, such as the tracking function for example. On such proprietary process is the PebbleBee™ utility, for example.

FIG. 2C depicts an exemplary control means 204 (e.g., a handle) according to an embodiment of the invention. In one embodiment, the control means 204 may be configured to include one or more ergonomically curved surfaces having dimensions that comfortably receive a wide variety of sizes of user's hands, for example, in order to maximize the comfort realized by the user (e.g., minimize the forces, such as pressures, placed on a user's hands or fingers) while at the same time insuring that the user is able to securely hold, and/or operate, the device 20a (see FIG. 2E for exemplary dimensions). In one embodiment, the element 204 may comprise a thermoplastic rubber material with reinforced nylon plastic, for example, to provide a stabilizing grip to a user of the device 20a though other similar materials may be used.

In an alternative embodiment, the control means 204 may further comprise means for sensing the position of the ribs 201a-n and/or runners 208a-n in order to determine if the ribs 201a-n and/or runners 208a-n are open or closed (i.e., is the umbrella open or closed). In more detail, the sensing means may comprise magnetic contacts or similar structure located with respect to the ribs 201a-n and runners 208a-n, for example, that can be used to generate one or more signals indicative of the position of the ribs 201a-n and/or runners 208a-n, and, therefore the status of the umbrella. For example, the position of the magnetic contacts may generate a first type of signal or signal level that may indicate the ribs 201a-n and/or runners 208a-n have been expanded or extended, while another position of the contacts may lead to the generation of a second signal type or level that may indicate that the ribs 201a-n and/or runners 208a-n have been contracted or retracted, for example.

Still further, components within the control means 204 (see FIG. 2K) may be operable to exchange signals with a communicatively paired device 30a, or with server 40, for example, in order to communicate the sensed or measured data and/or status of the device 20a. In an embodiment, upon receiving signals from a plurality of devices 20a-n, one or more of the devices 30a-n, 31a-n, server 40 or system 50 may be operable to determine the weather conditions local to the devices 20a-n. By way of a non-limiting example, one or more of devices 30a-n, 31a-n, server 40 or system 50 may conclude (i.e., compute) that the weather conditions local to the devices 20a-n include precipitation or bright sunshine because the signals from these devices 20a-n indicate that the devices 20a-n (umbrellas) are all (or almost all) open, or conversely, conclude that the weather conditions local to the devices 20a-n do not include precipitation or bright sunshine because the signals indicate the devices 20a-n are closed. In an embodiment, the one or more devices 30a-n, server 40 or system 50 may make such computations by executing instructions stored in its memory (or elsewhere) for completing a statistical analysis or estimation, for example.

As previously discussed, sensors within a device 20a-n may be operable to sense or measure data related to temperature, barometric pressure, air quality, wind speed, pressure applied to the covering 200 to name just a few of the parameters, and, thereafter, provide the sensed or measured data to a device 30a-n, 31a-n, server 40, and/or system 50 for example, via communication signals so that such apparatuses 30a-n, 31a-n, 40 and 50 may, in turn, provide messages or responsive signals to the devices 20a-n, for example.

FIG. 2D depicts another view of the element 204 depicted in FIG. 2C according to an embodiment of the invention. As depicted, FIG. 2D comprises an ergonomic curved surface 209 having dimensions that comfortably receive a wide variety of sizes of user's hands, for example, in order to maximize the comfort realized by the user (e.g., minimize the forces, such as pressures, placed on a user's hands or fingers) while at the same time insuring that the user is able to securely hold, and/or operate, the device 20a (see FIG. 2E for exemplary dimensions). More particularly, the control means 204 may comprise a dimension 207 (i.e., thickness) that comfortably receives a wide variety of sizes of user's hands, for example, while at the same time insuring that the user is able to securely hold, and/or operate, the entire device 20a.

Element 204 further comprises connection means 206 for connecting the structure 203 (e.g., shaft) to the control means 204 (e.g., handle), such as a female/male combination where the shaft 203 may comprise an end configured as a male insertion piece, and the connection means 206 is configured as a female, reception piece, for example. Yet further, FIG. 2D depicts an exemplary shape for the control means 204 that comprises an ergonomically comfortable shape operable to receive a wide range of hand sizes and shapes.

FIG. 2E depicts some exemplary dimensions of a control means 204, though the dimensions shown are merely exemplary.

FIG. 2F depicts a sectional view of the underside of the covering 200 (i.e., with the umbrella opened). As shown, the device 20a may comprise a plurality of covering runners 208a-n that may be connected to the plurality of ribs 201a-n by the plurality of reinforced joints 202a-n. In an embodiment, the runners may be 5 millimeters in thickness, for example.

It should be understood that the size of the device 20a (e.g., umbrella) may vary. Nonetheless, the same features and functions described herein may be incorporated into a small umbrella ("mini" umbrella) or larger umbrella (golf course sized umbrella).

Figure 3A:
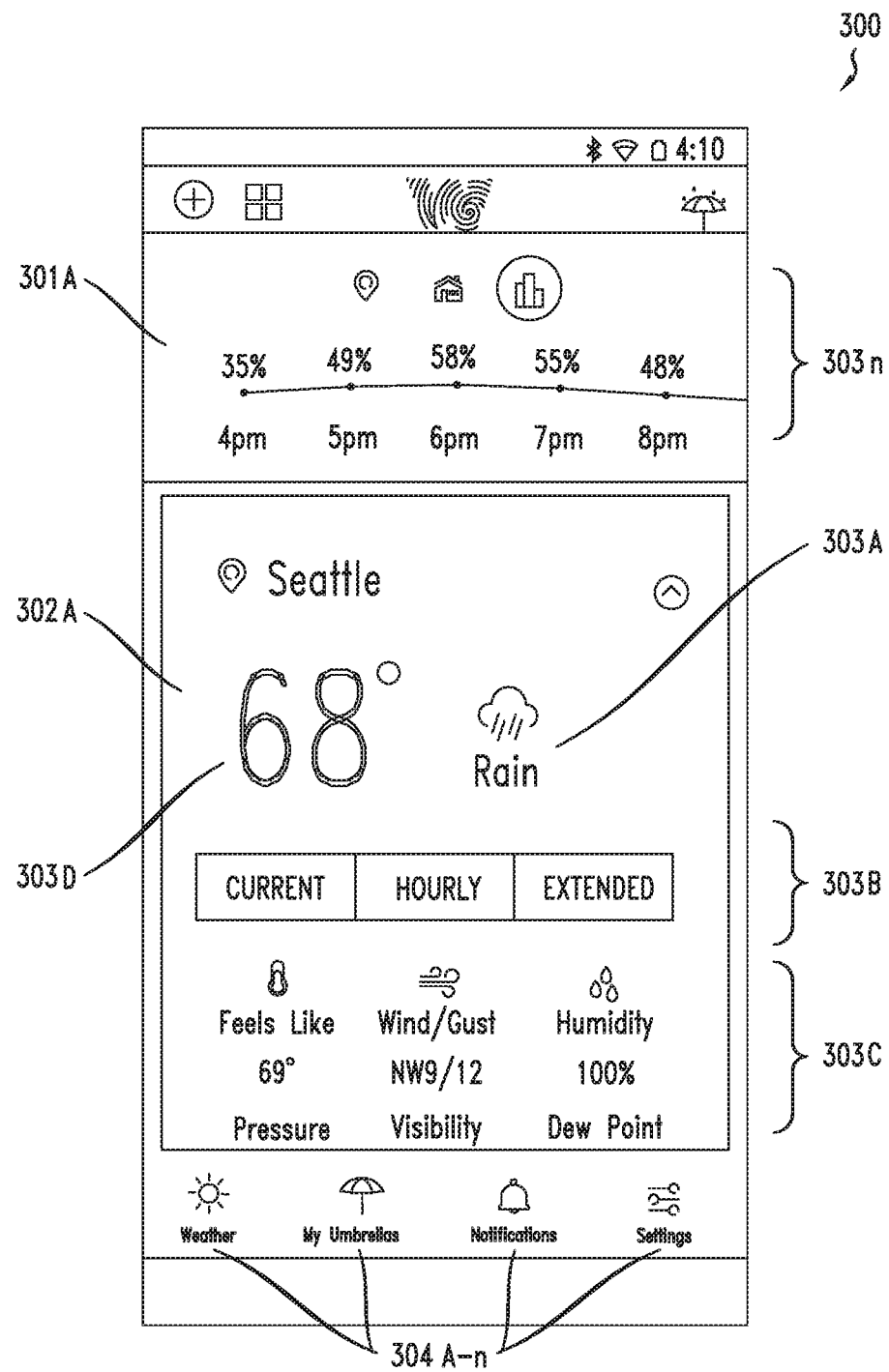
FIGS. 3A to 3C depict exemplary images that may be displayed on an exemplary device according to embodiments of the invention.
Figure 3B:
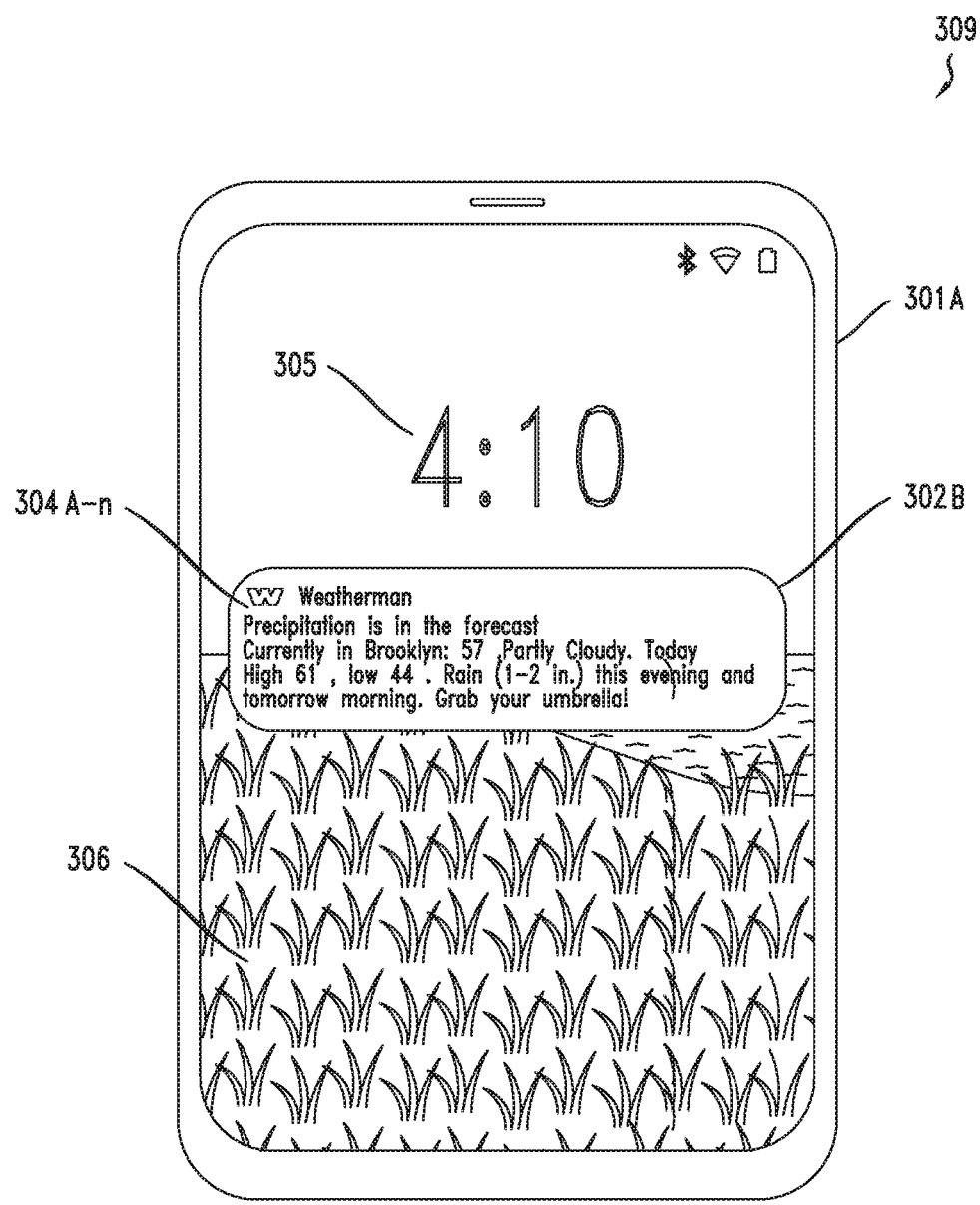
Figure 3C:
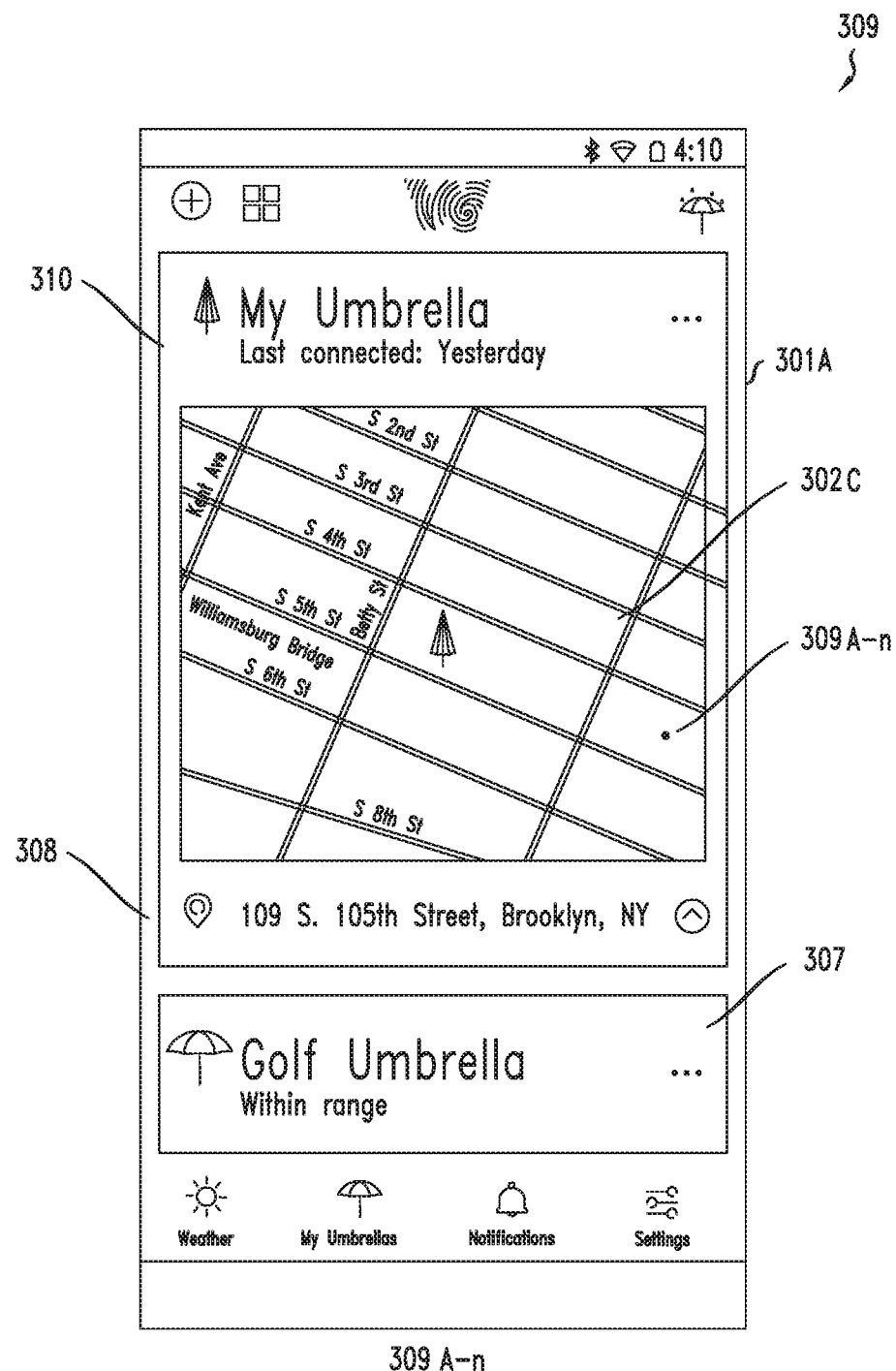

Referring now to FIGS. 3A to 3C, there are depicted exemplary images 302a-n (where "n" is the last image) that may be generated by a device 30a-n, 31a-n (e.g., by an APP downloaded to, and running on, device 30a-n, 31a-n) that has been paired with a device 20a, for example. In an embodiment, the images 302a-n may be visually presented to a user of device 30a on a display 301a according to embodiments of the invention. In the embodiment depicted in FIG. 3A the image 302a may comprise one or more weather-related conditions 303a-n (where "n" is the last condition) and/or associated messages, alerts, notifications, settings or instructions (collectively "messages") 304a-n (where "n" is the last message). One such message 304a-n is depicted in image 302b in FIG. 3B. This exemplary message may inform the user of system 20a,30a of the current weather conditions surrounding the system 20a,30a and/or device 30a, forecasted weather conditions, and that the user may need to use their device 20a because "Precipitation is in the forecast", to name just one of many types of weather related or associated messages that may be presented to the user within an image 302a-n on display 301a. Alternatively, the weather conditions 303a-n and messages 304a-n may be provided to the user audibly, as a combination of an image and audible sounds, as vibratory signals that comprise a pattern that can be recognized by the user or a combination of any of the above types of signals/images.

In FIG. 3B, the image 302b may further comprise a given time 305 and day (when time and a date is displayed), and a desirable photographic image 306, for example. In FIG. 3C, an image 302c may comprise status messages 307 related to the operation of the device 20a (umbrella) (e.g., the umbrella 20a is within range of the smartphone 30a) and/or messages 310 related to when the device 30a last connected to the device 20a. for example. Yet further, the image 302c may include a map grid 309a-n that depicts the present location of the device 30a.

As before, the displayed messages may be provided to the user audibly, as a combination of an image and audible sounds, as vibratory signals that comprise a pattern that can be recognized by the user or a combination of any of the above types of signals/images.

It should be understood that the images 302a-n and associated content 303 to 310 depicted in FIGS. 3A to 3C may also be displayed on devices 31a-n.

Further, it should be understood that the images 302a-n and associate content 303-310 may be generated by the server 40 or weather computing system 50 instead of by a device 30a-n, 31a-n and then transmitted to a device 30a-n, 31a-n as well (individually directed or broadcast) based on signals the server 40 or system 50 receives from the systems 20a-n, 30a-n and devices 31a-n, for example, or based on processes stored within such server 40 and/or system 50. Accordingly, the images and messages are merely exemplary of the type of images and messages that may be sent from server 40 or system 50. Still further, upon receipt of an image, message or another type of signal from a server 40 or system 50, a device 30a-n, 31a-n may be able to output an audio or visual signal. The output may comprise a pattern of blinking lights or audible sounds that blink or emit (e.g., turn "off" and 'on") in a pattern (when such audible or visual elements are made a part of a device of course). An audible or visual pattern may function to remind the user to use the umbrella 20a, or may function to remind the user he or she has forgotten the umbrella 20a if, for example.

Though the exemplary embodiments described above focus on communications between the server 40 and devices 20a-n and 30a-n, it should be understood that communications (signals and messages) may occur between one device 20a-n and another device 20a-n, and/or between one device 30a-n, 31a-n and another device 30a-n,31a-n without having to first traverse the server 40, for example.

For example, upon receiving signals from devices 20a-n that indicate the status (open or closed) of a device 20a-n or upon receiving information that has been manually input by a user of device 20a-n (umbrella) via their device 30a-n (e.g., smartphone) the server 40 an/or system 50 may be operable to determine the reliability of the signals it is receiving from a given device and/or user. For example, the server 40 or system 50 may compare the signals it receives indicating that a device 20a-n is open (and, therefore it may be raining) with other meteorological information to insure that, in fact, it was indeed raining in the area where the device 20a-n was located at the time the signal was sent to the server 40 and/or system 50. Similarly, other types of received signals may be verified by comparing it to statistically verifiable meteorological information, for example, or to other signals received from other devices 20a-n within the same area as the suspect signal. Upon completing such comparisons, the server 40 and/or system 50 may store the results of the comparison and apply the results to one or more statistical analyses to determine the reliability of a given device 20a-n or devices 20a-n. Thereafter, the server 40 and/or system 50 may be operable to generate or otherwise form a group consisting of those devices 20a-n it determines are the most reliable. As for the devices 20a-n that are not determined to be reliable, the server 40 and/or system 50 may be operable to ignore signals sent from such a device for the particular point in time and particular measurement when the information is inconsistent with other information, for example. Of course, the server 40 and/or system 50 may be operable to generate a group or groups by combining one or more factors. For example, a group may be formed from those devices 20a-n that are determined to be the most reliable, however, the number of devices 20a-n within such a group may also meet the minimum number of devices 20a-n and not exceed the maximum number of devices 20a-n.

Backtracking somewhat, the discussion above focused on a subscriber who for the most part may be a trained meteorologist. Such a subscriber may not, in fact, be a user of a device 20a-n or 30a-n. Rather, the subscriber is just interested in receiving reliable weather-related information. In other embodiments the subscriber may be a user of a device 20a-n and may not be a trained meteorologist. In such a scenario the information that such a user requests from the server 40 and/or system 50 may be the immediate and forecasted weather conditions surrounding the user's (and her systems 20a-n, 30a-n; both a short term and long term forecast) present or future area/location, the number of devices 20a-n that are present within the same present area and their status (open or closed), for example. This information may be provided to a user of a device 20a-n through communications and messages sent from the server 40 and/or system 50 to the user's device 30a-n (smartphone). Some exemplary messages are depicted in FIGS. 3A to 3C.

With the capabilities described above, the present invention provides the ability to provide users and subscribers with forecasts.

Backtracking again, regarding the microcontroller 2005A, it should be understood that each microcontroller 2005A within a given device 20a may be operable to receive the status (open or closed) of its corresponding device 20a, as well as other information and, in addition, transmit this information to other devices 30a-n (smartphones) within the transmission range of its transceiver 2005B. That is to say, the information from a given device 20a (umbrella) may be sent to its paired device 30a (smartphone) as well as additional, unpaired devices 30a-n (smartphones) within the transmission range of the given device 20a. Accordingly, when one or more devices 30a-n, 31a-n (smartphones) are within the transmission range of a given device 20a-n (umbrella) each of the devices 30a-n may be operable to receive information from the device 20a-n and relay (but not permanently store for security reasons) the information onto the server 40 and/or system 50. However, in embodiments of the invention, to avoid unnecessary duplication, the server 40 and/or system 50 may be operable to monitor the devices 30a-n and, upon determining that one of the additional, unpaired devices 30a-n, 31a-n has already received the information from the given device 20a and transmitted the information to the server 40 and/or system 50, may be operable to send signals to the remaining devices 30a-n, 31a-n that have received the same information (but have not yet sent it on to the server 40 and/or system 50) to instruct them not to transmit the information to the server 40 and/or system 50. Alternatively, the server 40 and or system 50 may be operable to instruct the additional, unpaired devices to ignore the information from the given device 20a-n. It may occur to the reader that one device 30a-n,31a-n may be within range of a number of devices 20a-n, and, thus, may be capable of receiving information from a number of devices 20a-n. Accordingly, each device 30a-n may include an electronic queue that temporarily stores the information it receives from a given device 20a-n until it is time to transmit the information to the server 40 and/or system 50 (provided of course it does not receive an instruction to not send the information) based on a first-in, first-out priority process, for example.

Thus, the server 40 and/or system 50 may be operable to receive weather-related information, device status information and other information directly from a device 20a-n, from its paired device 30a-n or from an additional device 30a-n.

In embodiments of the invention, the server 40 and/or system 50 may be able to generate a plurality of reports based on one or more types of statistical analyses of the received information. These analyses may be stored by the server 40 and/or system 50 and may be made available to a user or subscriber upon request or in accordance with a subscription agreement.

The ability to generate statistically reliable weather-related information for a geographical area, that may be remote from an existing weather station, is believed to be valuable for both short-term, and long-term forecasting.

Regarding short-term forecasting, in an embodiment the weather-related information received from systems 20a-n, 30a-n may be used to continuously generate a short-term forecast for a given geographical area that is updated and stored by the server 40 and/or system 50 at least every hour, or more rapidly. In one embodiment, the longest period of time between updates may be one hour to insure the forecast is current and accurate.

With respect to long-term forecasting, the server 40 and/or system 50 may be operable to generate a long-term forecast for a given geographical area based on current information it has received from systems 20a-n, 30a-n as well as historical information it has stored in its memory or in an associated database (or databases).

The embodiments discussed herein have included the exchange or communication of signals between devices, servers and systems that may be used to compute weather related conditions. It should be understood that these signals may be encrypted (e.g., TLS encryption) before being exchanged or communicated. Yet further, the encrypted signals may be exchanged or communicated via a secure, private APIs, for example.

It should be apparent that the foregoing describes only selected embodiments of the invention. Numerous changes and modifications may be made to the embodiments disclosed herein without departing from the general spirit and scope of the invention.

We claim:

1. A system for forming dynamic, micro-climate groups comprising a network server operable to,
  (i) identify a number of passive weather collecting devices capable of passively collecting weather-related information in real-time and paired smartphones capable of actively and passively collecting weather-related information in real-time, wherein each of the passive weather collecting devices are communicatively paired to at least one of the smartphones;
  (ii) form one or more dynamic, micro-climate groups comprising passive devices and paired smartphones from among the identified devices, and
  (iii) distribute the passively and actively collected weather-related information from the one or more, dynamic micro-climate groups or forecasts to individuals in a particular geographical area or to subscribers, and complete weather-related computations based on the passively and actively collected weather-related information from the one or more, dynamic micro-climate groups in conjunction with stored historical information; and
  a plurality of the identified passive weather collecting devices and smartphones, each device operable to collect weather-related information in real-time, wherein each of the passive weather collecting devices are communicatively paired to at least one of the smartphones, and each smartphone is capable of displaying the collected weather-related information to a user of the smartphone.

2. A weather-information collection system, the system comprising:
 a passive collection device configured as a part of one or more formed dynamic, micro-climate collection groups, the device comprising a transceiver for communicatively pairing the passive collection device to at least one smartphone that is part of the same formed dynamic, micro-climate collection group as the passive collection device, and transmitting passively collected, weather-related information collected by the passive collection device as part of the formed dynamic micro-climate collection groups to the communicatively paired smartphone;
 at least one smartphone capable of separately, passively and actively collecting weather-related information and displaying the collected weather information to a user of the smartphone.

3. The system as in claim 2 further comprising additional smartphones, or personal digital assistants, wireless phones, laptops, or tablets, each communicatively paired with at least one passive collection device and each separately, passively and actively collecting weather-related information and capable of displaying collected weather information to a respective user.

4. The system as in claim 3 wherein the passive collection device comprises an umbrella.

5. The system as in claim 2 wherein the transceiver transmits the passively collected, weather-related information to the communicatively paired smartphone via Bluetooth 4.2+ formatted signals.

6. The system as in claim 2 wherein the smartphone is operable to transmit the passively collected information from the passive collection device to a central computing device, transmit actively collected, weather-related information to the central computing device.

7. The system as in claim 2, wherein the transceiver is further operable to communicate with additional devices that the passive collection device is not communicatively paired with that are within the transmission range of the transceiver.

8. The system as in claim 2 wherein the smartphone further operable to transmit the passively collected information from the passive collection device to a another member of the same group, and transmit the actively collected, weather-related information to the other member of the same group.

9. A weather-information collection system, the system comprising:
 one or more central computing devices operable to,
  form or re-form one or more configurable, micro-climate collection groups, each group comprising at least one or more devices for passively collecting weather-related information and one or more smartphones for passively and actively collecting weather-related information, each of the smartphones communicatively paired with at least one of the devices and capable of displaying the collected weather-related information to a user of the smartphone;
  determine a path of one of the devices or a respective paired smartphone within the formed or re-formed configurable, micro-climate collection group based on geo-spatial information and time information; and
  provide a current or historical weather-related condition for a geospatial position in the path based upon the collected weather-related information from the devices and respective paired smartphones to the one or more paired smartphones for display to a respective user.

10. The system as in claim 9 wherein the one or more central computing devices are further operable to:
 compare the received passively collected or passively and actively collected weather-related information from each device and paired smartphone within each group to (i) weather-related information received from other devices and paired smartphones within the same group or associated with substantially the same geospatial information in real-time, or (ii) to the historical weather-related information to determine the reliability of the received information.

11. The system as in claim 10 wherein the one or more central computing devices are further operable to provide the current or historical weather-related information to smartphones that not a part of the one or more configurable, micro-climate collection groups for display to users of such smartphones.

12. The system as in claim 10 wherein the current and historical weather information comprise forecasts, and the one or more computing devices are further operable to provide the forecasts to an authenticated individual.

13. The system as in claim 9 wherein the one or more central computing devices are further operable to:
 receive the geospatial information from paired devices and smartphones and one or more unpaired devices, and form or re-form a configurable, micro-climate collection group of paired and unpaired devices, wherein each member of the group has a same or substantially the same, geospatial information, and
 remove a paired or unpaired device from an existing configurable, micro-climate collection group upon determining that the device has geo-spatial information that is substantially different from the geo-spatial information of the other members of the existing group.

14. The system as in claim 13 wherein the geo-spatial information comprises a variable size of a geographical area, elevation and topology.

15. The system as in claim 13 wherein the one or more central computing devices are further operable to form or re-form the configurable, micro-climate collection group comprising a minimum or maximum number of paired and unpaired devices that currently are associated with the same or substantially the same received, geospatial information.

\* \* \* \* \*